US006175592B1

United States Patent
Kim et al.

(10) Patent No.: US 6,175,592 B1
(45) Date of Patent: Jan. 16, 2001

(54) FREQUENCY DOMAIN FILTERING FOR DOWN CONVERSION OF A DCT ENCODED PICTURE

(75) Inventors: Hee-Yong Kim, Plainsboro, NJ (US); Edwin Robert Meyer, Bensalem, PA (US); Ren Egawa, Princeton, NJ (US)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/815,804

(22) Filed: Mar. 12, 1997

(51) Int. Cl.$^7$ .............................. H04N 7/01; H04N 7/12

(52) U.S. Cl. ..................... 375/240; 348/403; 348/416; 348/441

(58) Field of Search .................................. 348/384, 390, 348/400–403, 405, 409–413, 415, 416, 420, 424, 426, 441; 382/232, 233, 236, 238, 248, 250; 375/240; H04N 7/24, 7/30, 7/01, 7/12

(56) References Cited

U.S. PATENT DOCUMENTS

| | | |
|---|---|---|
| 3,997,772 | 12/1976 | Crochiere et al. . |
| 4,468,688 | 8/1984 | Gabriel et al. . |
| 4,472,732 | 9/1984 | Bennett et al. . |
| 4,472,785 | 9/1984 | Kasuga . |
| 4,536,745 | 8/1985 | Yamaguchi et al. . |

(List continued on next page.)

OTHER PUBLICATIONS

Jill Boyce, John Henderson and Larry Pearlstein, "SDTV Receivers With HDTV Decoding Capability," ACATS Technical Subgroup Meeting, May 18, 1995, Washington, D.C., (18 pp).

H. Blair Benson, revised by Jerry Whitaker, "Television Engineering Handbook," (Revised copyright 1992, 1986 by McGraw–Hill, Inc., (7 pp.).

Jill Boyce and Larry Pearlstein "Low–Cost All Format ATV Decoding With Improved Quality" 30th Advanced Motion Imaging Conference, Paper #11, Feb. 2, 1996 (7 pp.).

Jack S. Fuhrer, "The All Format Decoder", Hitachi America, Ltd., Jun. 3, 1996 (11 pp.).

"Recommended Practices For Video Encoding Using The ATSC Digital Television Standard–Consideration Of Downsampling Decoders", Jun. 3, 1996 (6 pp.).

Larry Pearlstein "Discussion on Recommended Practices For North American ATV Coding", Hitachi America Ltd., Presented to SMPTE WG TVCM, Mar. 8, 1996 (8 pp.).

Data Sheet "GP9101 High Performance Multirate Digital Filter", Gennum Corporation, Jan. 1994 (21 pp.).

*Primary Examiner*—Richard Lee
(74) *Attorney, Agent, or Firm*—Ratner & Prestia

(57) ABSTRACT

A discrete cosine transform domain (DCT) filter for lowpass filtering a high resolution encoded video image represented as frequency-domain coefficient values, such as macroblocks, before decimation of the video image in the spatial domain. The DCT filter masks or weights the DCT coefficients of the video image macroblocks before processing by an inverse DCT. The filter may be implemented as a block mirror filter in the frequency domain, and the filter values may be combined with the IDCT coefficient values. Original motion vectors of the high resolution encoded video image are translated because low resolution reference images used by the decoder are not equivalent to the original high resolution images. Therefore, motion vectors are scaled to retrieve low resolution prediction blocks which are up-sampled to generate the original pixel and half-pixel values in the spatial domain. The up-sampled prediction block is added to the DCT filtered inverse-DCT transformed pixel values if the current macroblock is part of a non-intraframe encoded image. After motion compensation processing of the original macroblock, the reconstructed macroblock in the lower resolution is decimated accordingly.

14 Claims, 14 Drawing Sheets

U.S. PATENT DOCUMENTS

| | | |
|---|---|---|
| 4,631,750 | 12/1986 | Gabriel et al. . |
| 4,652,908 | 3/1987 | Fling et al. . |
| 4,774,581 | 9/1988 | Shiratsuchi . |
| 4,870,661 | 9/1989 | Yamada et al. . |
| 4,908,874 | 3/1990 | Gabriel . |
| 5,057,911 | 10/1991 | Stec et al. . |
| 5,262,854 | 11/1993 | Ng . |
| 5,274,372 | 12/1993 | Luthra et al. . |
| 5,327,235 | 7/1994 | Richards . |
| 5,331,346 | 7/1994 | Shields et al. . |
| 5,389,923 | 2/1995 | Iwata et al. . |
| 5,481,568 | 1/1996 | Yada . |
| 5,483,474 | 1/1996 | Arbeiter et al. . |
| 5,489,903 | 2/1996 | Wilson et al. . |
| 5,528,301 | 6/1996 | Hau et al. . |
| 5,613,084 | 3/1997 | Hau . |
| 5,614,957 * | 3/1997 | Boyce et al. ............... 348/424 |
| 5,726,711 * | 3/1998 | Boyce ............... 348/409 |
| 5,737,019 * | 4/1998 | Kim ............... 348/405 |
| 5,774,206 * | 6/1998 | Wasserman et al. ............... 348/416 |
| 5,784,494 * | 7/1998 | Strongin et al. ............... 348/426 |
| 5,835,151 * | 11/1998 | Sun et al. ............... 348/403 |
| 5,841,479 * | 11/1998 | Van Gestel et al. ............... 348/426 |

\* cited by examiner

FIG. 3A

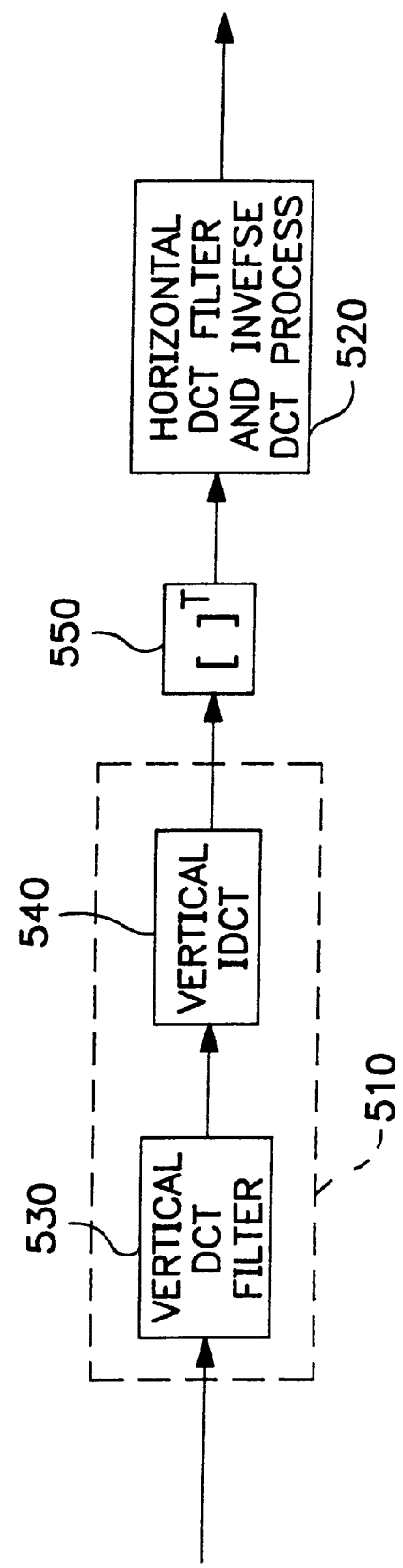

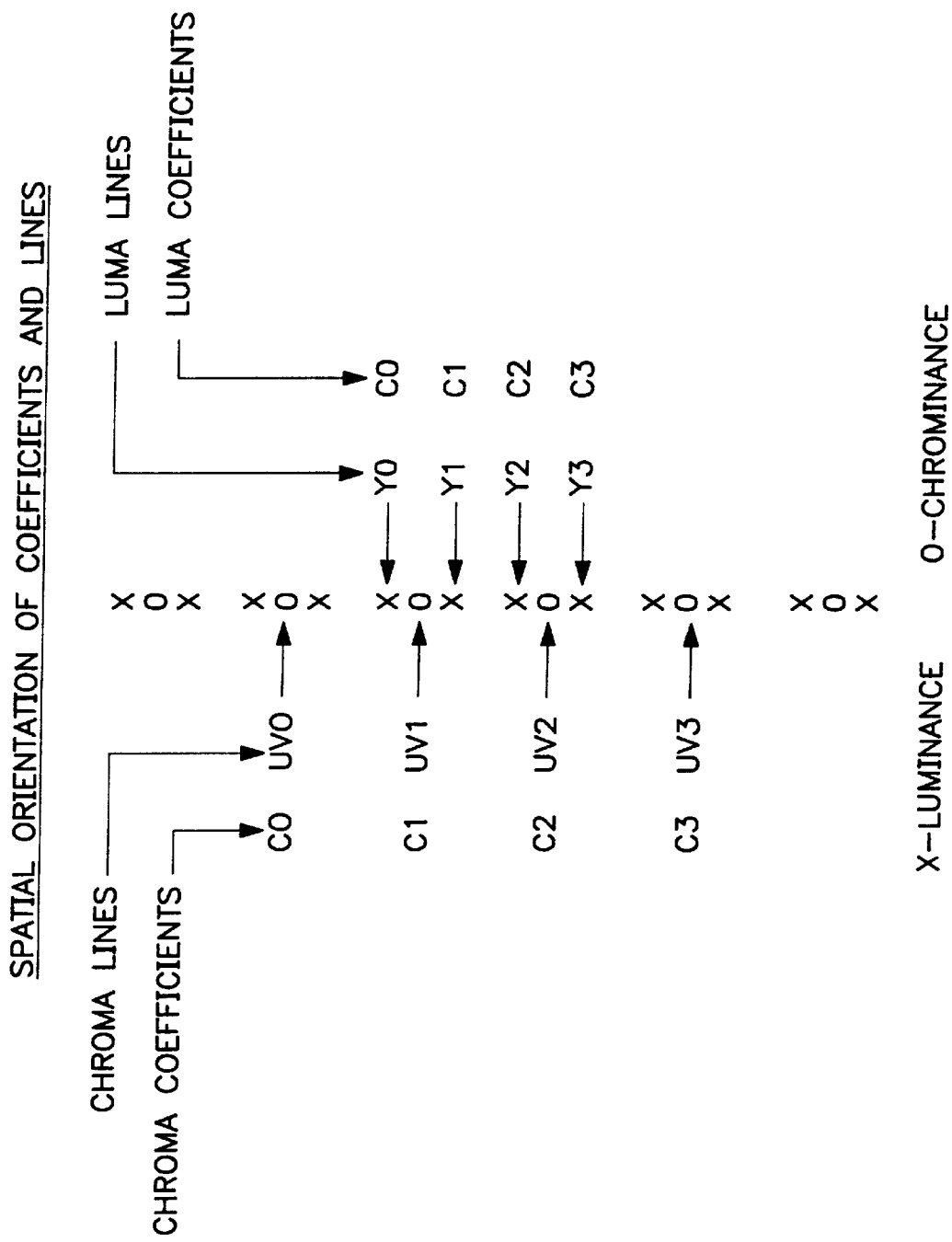

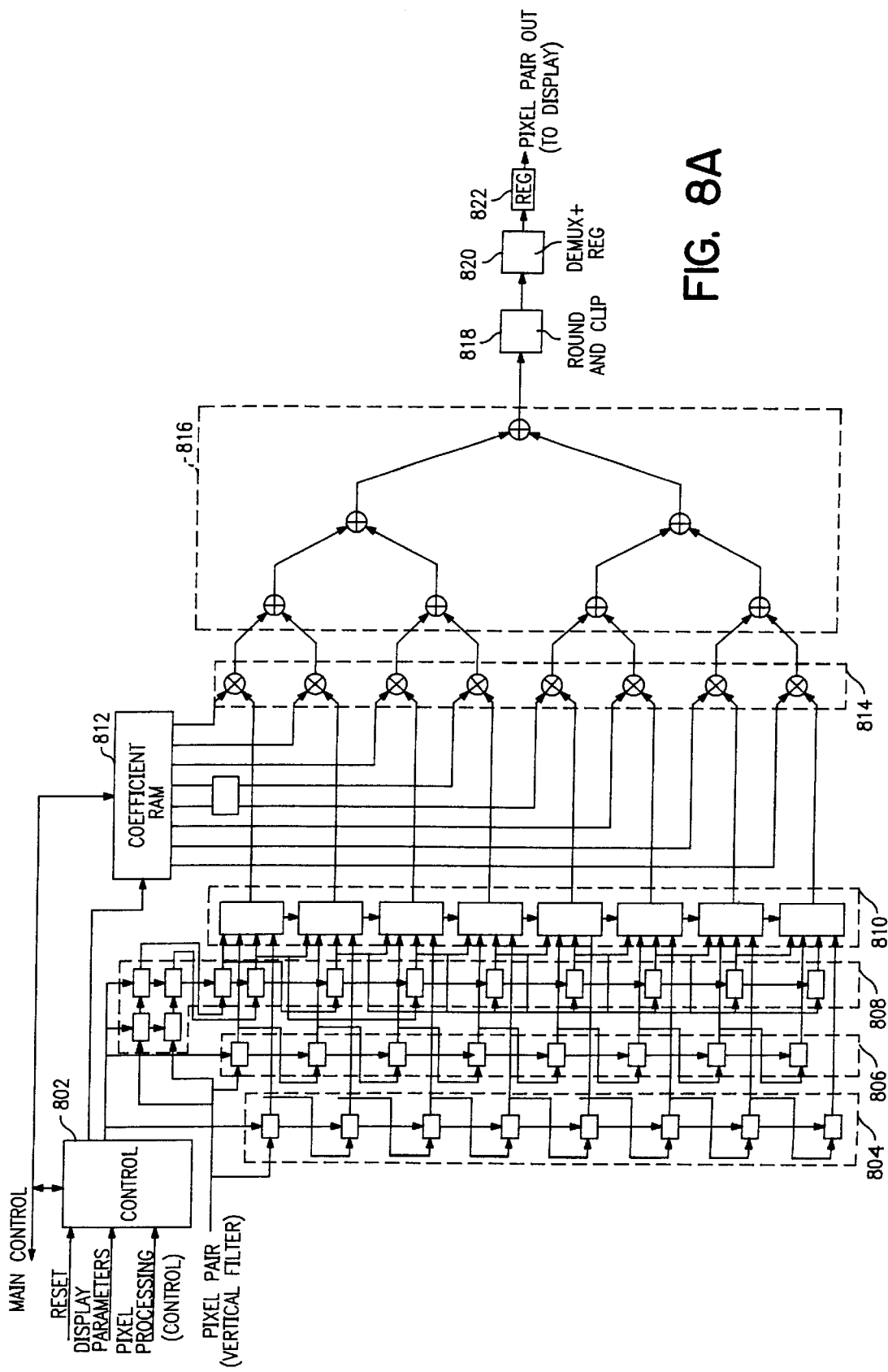

FREQUENCY DOMAIN FILTERING FOR DOWN CONVERSION OF A DCT ENCODED PICTURE

FIELD OF THE INVENTION

This invention relates to a decoder having a filter for down conversion of frequency domain encoded signals, e.g. MPEG-2 encoded video signals, and more specifically to a decoder which converts a high resolution video signal to a low resolution video signal by filtering the frequency domain signals.

BACKGROUND OF THE INVENTION

In the United States a standard has been proposed for digitally encoded high definition television signals (HDTV). A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level is intended for coding high-definition television images. Images encoded according to the Main Profile, High Level standard may have as many as 1,152 active lines per image frame and 1,920 pixels per line.

The Main Profile, Main Level standard, on the other hand, defines a maximum picture size of 720 pixels per line and 567 lines per frame. At a frame rate of 30 frames per second, signals encoded according to this standard have a data rate of 720*567*30 or 12,247,200 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group of pictures layer, the picture layer, the slice layer, the macroblock layer, and the block layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

Down-conversion of high resolution Main Profile, High Level pictures to Main Level, Main Level pictures, or other lower resolution picture formats, has gained increased importance for reducing implementation costs of HDTV. Down conversion allows replacement of expensive high definition monitors used with Main Profile, High Level encoded pictures with inexpensive existing monitors which have a lower picture resolution to support, for example, Main Profile, Main Level encoded pictures, such as NTSC or 525 progressive monitors. Down conversion converts a high definition input picture into lower resolution picture for display on the lower resolution monitor.

To effectively receive the digital images, a decoder should process the video signal information rapidly. To be optimally effective, the coding systems should be relatively inexpensive and yet have sufficient power to decode these digital signals in real time.

One method of down conversion of the prior art simply low pass filters and decimates the decoded high resolution, Main Profile, High Level picture to form an image suitable for display on a conventional television receiver. Consequently, using existing techniques, a decoder employing down-conversion may be implemented using a single processor having a complex design, considerable memory, and operating on the spatial domain image at a high data rate to perform this function. The high resolution, and high data rate, however, requires very expensive circuitry, which would be contrary to the implementation of a decoder in a consumer television receiver in which cost is a major factor.

SUMMARY OF THE INVENTION

An apparatus for forming a decimated video signal receives an encoded video signal representing a video image, the encoded video signal being a frequency-domain transformed video signal. The apparatus includes means for providing the encoded video signal as a plurality of high resolution frequency-domain video coefficient values. The apparatus further includes down-conversion filter means for receiving and weighting selected ones of the plurality of high resolution frequency-domain video coefficient values to form a set of filtered frequency-domain video coefficients; and inverse-transform means for receiving and transforming the filtered frequency-domain video coefficients into a set of low resolution pixel sample values. The apparatus also includes a decimating processor for receiving and retaining selected ones of the set of low resolution pixel sample values to provide the decimated video signal.

BRIEF DESCRIPTION OF THE DRAWINGS

These and other features and advantages of the present invention will become apparent from the following detailed description, taken in conjunction with the accompanying drawings, wherein:

FIG. 3A illustrates subpixel positions and corresponding predicted pixels for the 3:1 and 2:1 exemplary embodiments of the present invention.

FIG. 5 illustrates an exemplary implementation of the filter for down-conversion for a two-dimensional system processing the horizontal and vertical components implemented as cascaded one-dimensional IDCTs.

FIG. 7B illustrates the spatial relationships between coefficients and pixel sample space of lines of the vertical programmable filter of FIG. 7A.

FIG. 8A is a high level block diagram illustrating a horizontal programmable filter of one embodiment of the present invention.

DETAILED DESCRIPTION

The exemplary embodiment of the invention filters decoded HDTV signals which have been encoded according to the MPEG-2 standard and in particular, the Main Profile, High Level MPEG-2 standard.

The invention described herein, however, is not limited to down conversion filtering of decoded HDTV signals. The filtering method described below may also be used to filter other types of frequency-domain encoded digital signals which may be divided into sections, filtered, and then recombined.

The MPEG-2 Main Profile standard defines a sequence of images in six levels: the sequence level, the group of pictures level, the picture level, the slice level, the macroblock level and the block level. Each of these levels may be considered to be a record in a data stream, with the later-listed levels occurring as nested sub-levels in the earlier listed levels. The records for each level, except the block level, include a header section which contains data that is used in decoding its sub-records.

Each block of the encoded HDTV signal contains data representing 64 respective coefficient values of a discrete cosine transform (DCT) representation of 64 picture elements (pixels) in the HDTV image.

In the encoding process, the pixel data is subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

Figure 1:
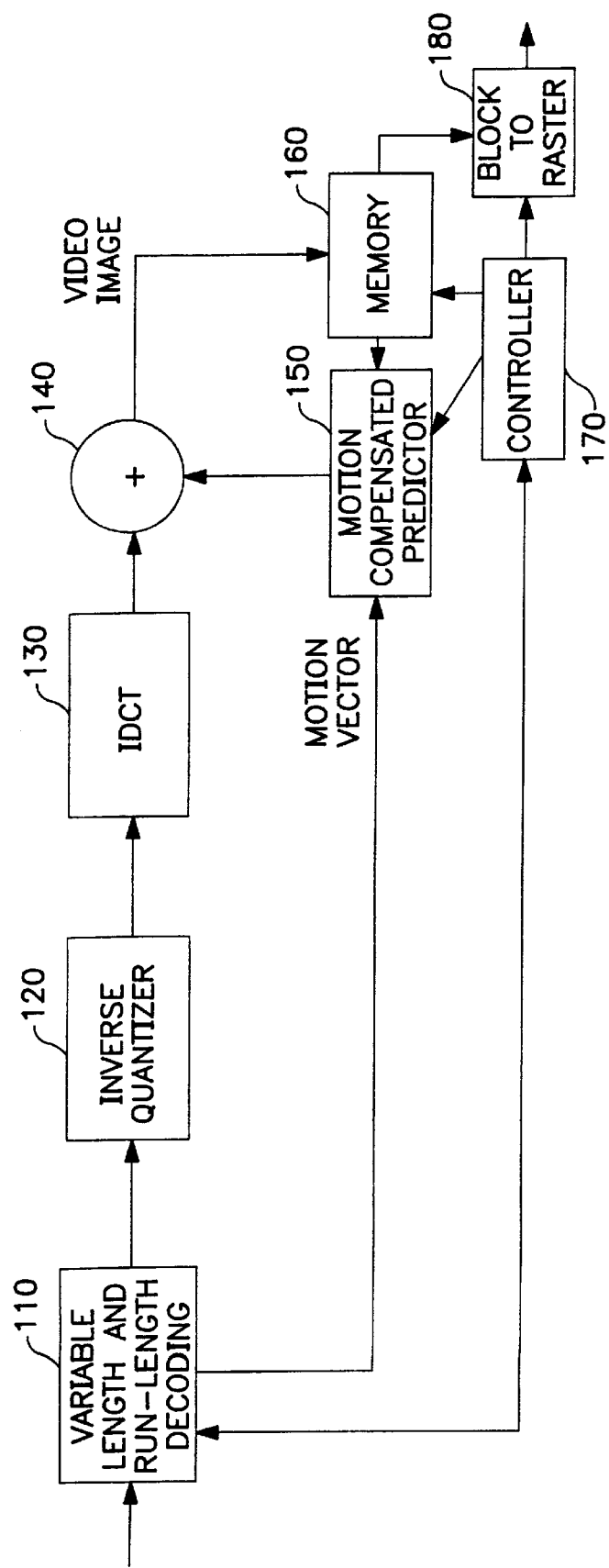
FIG. 1 is a high level block diagram of a video decoding system of the prior art.

FIG. 1 is a high level block diagram of a typical video decoding system of the prior art. The video decoder of the prior art includes an Entropy Decoder 110, which is usually a variable length decoder and a run length decoder, an inverse quantizer 120, and inverse discrete cosine transform (IDCT) processor 130. The exemplary system also includes a Controller 170 which controls the various components of the decoding system responsive to the control information retrieved from the input bit stream by the Entropy Decoder 110. For processing of prediction images, the prior art system further includes a memory 160, adder 140, Motion Compensation Processor 150, and Block to Raster converter 180.

The Variable Length Decoder 110 receives the encoded video image signal, and reverses the encoding process to produce control information including motion vectors describing the relative displacement of a matching macroblock in a previously decoded image which corresponds to a macroblock of the predicted picture that is currently being decoded. The Variable Length Decoder 110 also receives the quantized DCT transform coefficients of the blocks of either the current video image, if intraframe encoding is used, or the difference between the current and the predicted video image, if interframe encoding is used. The Inverse Quantizer 120 receives the quantized DCT transform coefficients and reconstructs the quantized DCT coefficients for a particular macroblock. The quatization matrix to be used for a particular block is received from the Variable Length Decoder 110.

The IDCT processor 130 transforms the reconstructed DCT coefficients to pixel values in the spatial domain (for each block of 8×8 matrix values representing luminance or chrominance components of the macroblock, and for each block of 8×8 matrix values representing the differential luminance or differential chrominance components of the predicted macroblock).

If the current macroblock is not predictively encoded, then the output matrix values are the pixel values of the corresponding macroblock of the current video image. If the macroblock is interframe encoded, the corresponding macroblock of the previous video picture frame is stored in memory 160 for use by the Motion Compensation processor 150. The Motion Compensation Processor 150 receives the previous macroblock from Memory 160 responsive to the motion vector, and then adds the previous macroblock to the current IDCT transformed macroblock (corresponding to a residual component of the present predictively encoded frame) in Adder 140 to produce the corresponding macroblock of pixels for the current video image, which is then stored into the Memory 160.

a) The Down Conversion Filter System

Figure 2A:
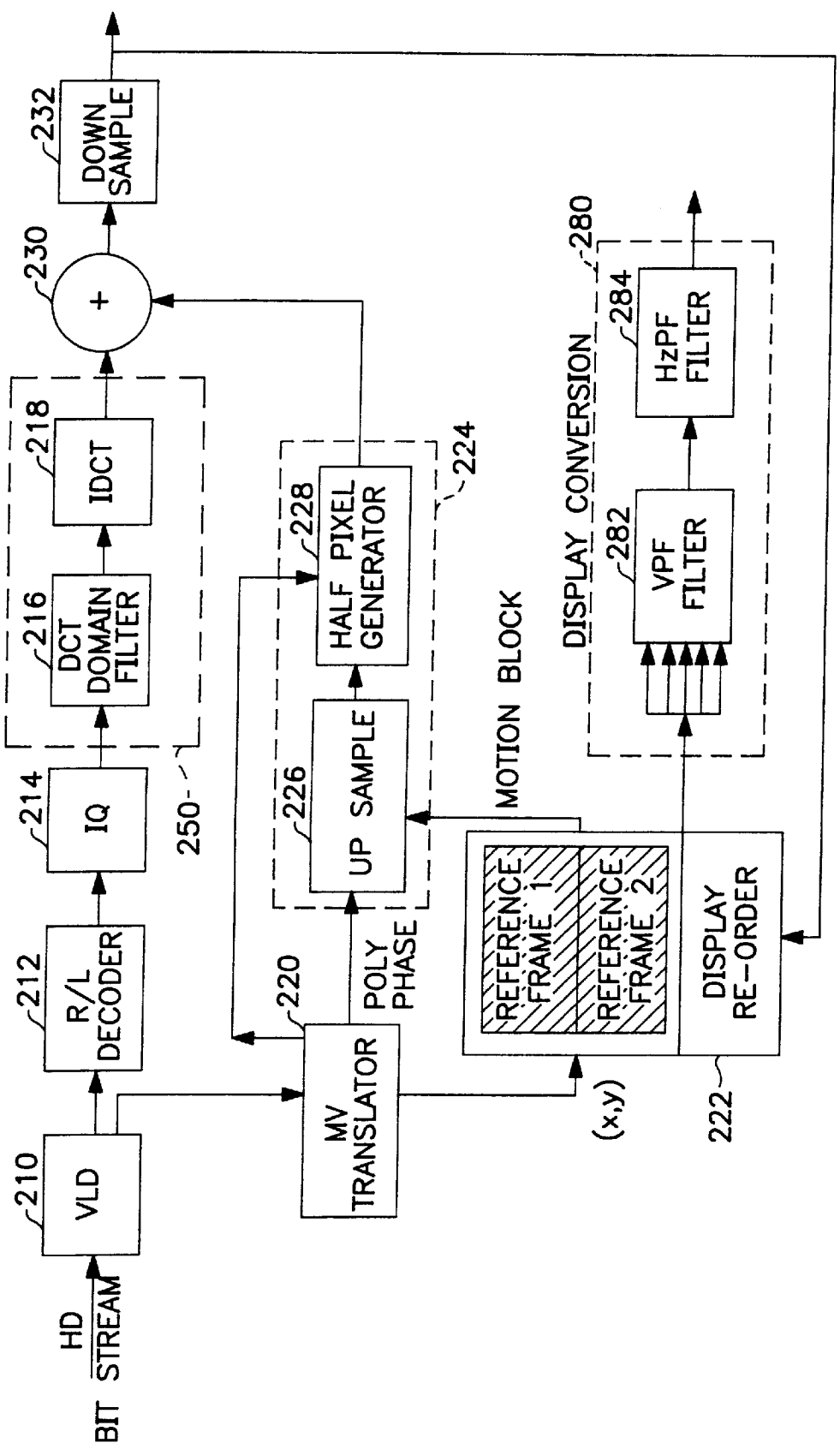
FIG. 2A is a high level block diagram of the down conversion system of one exemplary embodiment of the present invention.

FIG. 2A is a high level block diagram of the down conversion system of one exemplary embodiment of the present invention. As shown in FIG. 2A, the down conversion system includes a variable length decoder (VLD) 210, a run-length (R/L) decoder 212, an inverse quantizer 214, and inverse discrete cosine transform (IDCT) processor 218. In addition, the down conversion system includes a Down Conversion filter 216 and Down Sampling process 232 for filtering of encoded pictures. While the following describes the exemplary embodiment for a Main Level, High Profile encoded input, the present invention may be practiced with any similarly encoded high resolution image bit stream.

The down conversion system also includes a Motion Vector (MV) Translator 220, a Motion Block Generator 224 including Up-Sampling Processor 226 and Half-Pixel Generator 228 and a Reference Frame Memory 222.

The system of the first exemplary embodiment also includes a Display Conversion Block 280 including a Vertical Programmable Filter (VPF) 282 and Horizontal Programmable Filter (HZPF) 284. The Display Conversion Block 280 converts downsampled images into images for display on a particular display having a lower resolution, and is described in detail subsequently in section f) on Display Conversion.

The Down Conversion Filter 216 performs a lowpass filtering of the high resolution (e.g. Main Profile, High Level DCT) coefficients in the frequency domain. The Down Sampling Process 232 eliminates spatial pixel values by decimation of the filtered Main Profile, High Level picture to produce a set of pixel values which can be displayed on a monitor having lower resolution than that required to display a Main Profile, High Level picture. The exemplary Reference Frame Memory 222 stores the spatial pixel values corresponding to at least one previously decoded reference frame having a resolution corresponding to the down-sampled picture. For interframe encoding, the MV Translator 220 scales the motion vectors for each block of the received picture consistent with the reduction in resolution, and the High Resolution Motion Block Generator 224 receives the low resolution motion blocks provided by the Reference Frame Memory 222, upsamples these motion blocks and generates half pixel values to provide motion blocks which exhibit good spatial correspondence to the decoded and filtered differential pixel blocks.

The operation of an exemplary embodiment of the down-conversion system of the present invention for intra-frame encoding is now described. The Main Profile, High Level bit-stream is received and decoded by VLD 210. In addition to header information used by the HDTV system, the VLD 210 provides DCT coefficients for each block and macroblock, and motion vector information. The DCT coefficients are run length decoded in the R/L decoder 212 and inverse quantized by the inverse quantizer 214. The VLD 210 and R/L Decoder 212 correspond to the Entropy Decoder 110 of FIG. 1.

Since the received video image represented by the DCT coefficients is a high resolution picture, the exemplary embodiment of the present invention employs lowpass filtering of the DCT coefficients of each block before decimation of the high resolution video image. The R/L Decoder 212 provides the DCT coefficients to the DCT filter 216 which performs a lowpass filtering in the frequency domain by weighting the DCT coefficients with predetermined filter coefficient values before providing them to the IDCT processor 218. For one exemplary embodiment of the present invention, this filter operation is performed on a block by block basis.

The IDCT processor 218 provides spatial pixel sample values by performing an inverse discrete cosine transform of the filtered DCT coefficients. The Down Sampling processor 232 reduces the picture sample size by eliminating spatial pixel sample values according to a predetermined decimation ratio; therefore, storing the lower resolution picture uses a smaller frame memory compared to that which would be needed to store the higher resolution Main Profile, High Level picture.

The operation of an exemplary embodiment of the down-conversion system of the present invention for predicted frames of the encoding standard is now described. In the exemplary embodiment following the MPEG standard. In this example, the current received image DCT coefficients represent the DCT coefficients of the residual components of the predicted image macroblocks, which is now referred to as a predicted frame (P-frame) for convenience. In the described exemplary embodiment, the horizontal components of the motion vectors for a predicted frame are scaled since the low resolution reference pictures of previous frames stored in memory do not have the same number of pixels as the high resolution predicted frame (Main Profile, High Level).

Referring to FIG. 2A, the motion vectors of the Main Profile, High Level bit stream provided by the VLD 210 are provided to the MV Translator 220 Each motion vector is scaled by the MV Translator 220 to reference the appropriate prediction block of the reference frame of a previous image stored in Memory 222. The size (number of pixel values) in the retrieved block is smaller than block of the corresponding high resolution block used to encode the current image; consequently, the retrieved block is upsampled to form a prediction block having the same number of pixels as the residual block provided by the IDCT Processor 218.

The prediction block is upsampled by the Up-Sampling Processor 226 responsive to a control signal from the MV Translator 220 to generate a block corresponding to the original high resolution block of pixels, and then half pixel values are generated—if indicated by the motion vector for the up-sampled prediction block in the Half Pixel Generator 228—to ensure proper spatial alignment of the prediction block. The upsampled and aligned prediction block is added in Adder 230 to the current filtered block, which is, for this example, the reduced resolution residual component from the prediction block. All the processing is done on macroblock by macroblock basis. After the motion compensation process is complete for the current high-resolution macroblock, the reconstructed macroblock is decimated accordingly in the Down Sampling Processor 232. This process does not reduce the resolution of the image but simply removes redundant pixels from the low resolution filtered image.

Once the downsampled macroblocks for an image are available, the Display Conversion Block 280 adjusts the image for display on a low resolution television display by filtering the vertical and horizontal components of the down-sampled image in VPF 282 and HZPF 284 respectively.

Figure 2B:
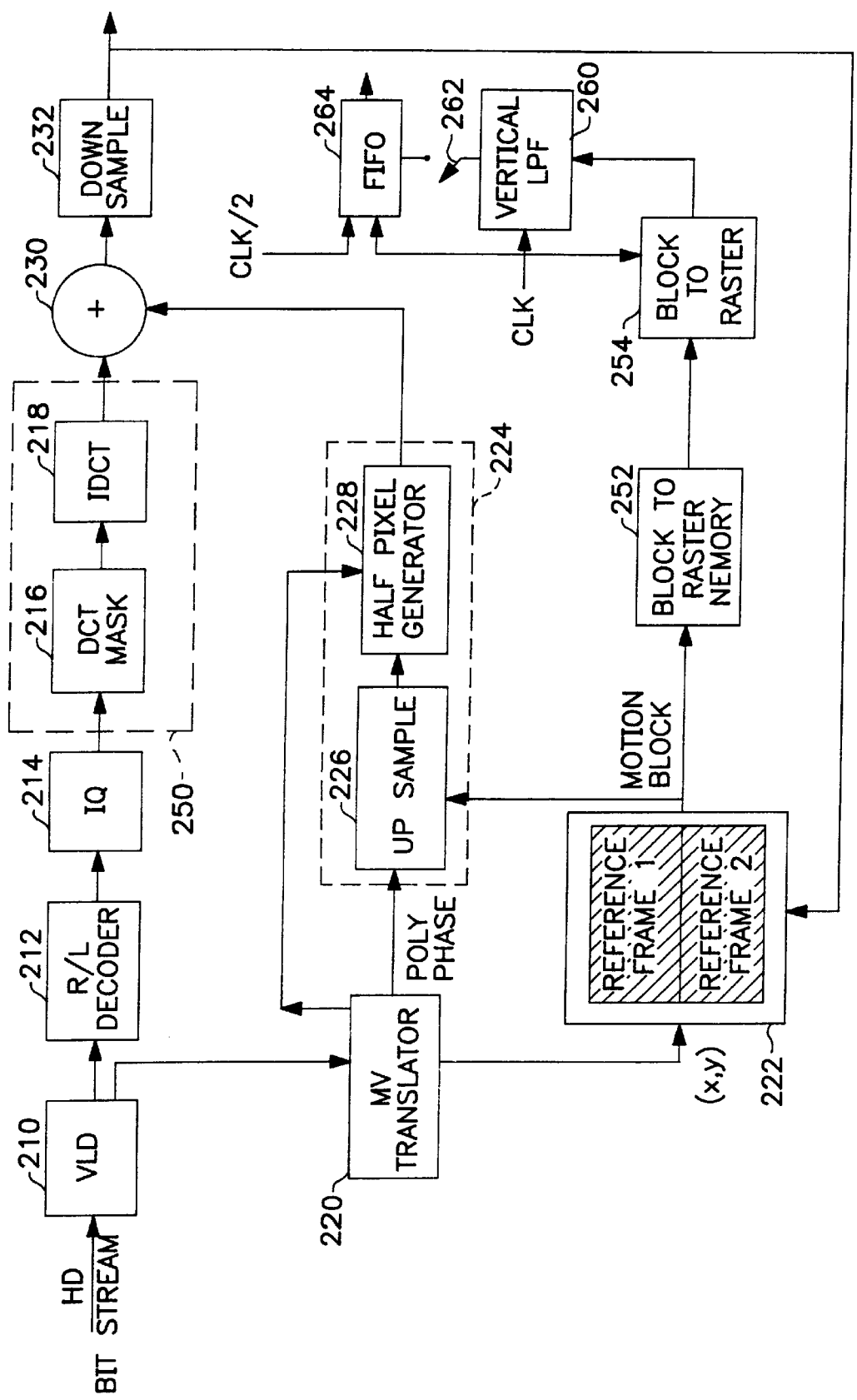
FIG. 2B is a high level block diagram of the down conversion system of a second exemplary embodiment of the present invention employing an inexpensive horizontal and vertical filtering implementation.

FIG. 2B is a high level block diagram of the down conversion system of a second exemplary embodiment of the present invention employing an inexpensive horizontal and vertical filtering implementation for display conversion. For the system of FIG. 2B, the down conversion process described previously remains the same except for the different method of filtering the horizontal and vertical components of the image, and is implemented as follows for an exemplary 3:1 and 2:1 conversion.

The system of the second exemplary embodiment includes a Block to Raster Memory 252 for storage of the processed and decoded images, and the Block to Raster Processor 254 for providing the lower resolution images which have been horizontally decimated. The system also includes a Vertical low pass filter (LPF) 260 for low pass filtering of the vertical pixel values, switch 262 for reading selected horizontal lines from the Vertical LPF 260, and a FIFO buffer 264 to provide the low resolution picture.

The system also includes a Vertical low pass filter (LPF) 260 for low pass filtering of the vertical pixel values from the Block to Raster 254. Selected horizontal lines are received into the FIFO 264 by use of a selective switch 262. Reducing the number of horizontal lines reduces the vertical aspect of the picture. The FIFO buffer 264 receives the horizontal lines at the higher resolution clock rate CLK. However, to provide the low resolution picture the FIFO buffer 264 desirably provides the horizontal lines at a reduced clock rate. For 2:1 decimation, as shown in FIG. 2B, the clock rate CLK/2 is one-half the higher clock rate. The method of display conversion for the inexpensive embodiment of the present invention is described in detail subsequently in section f).

b) Macroblock Prediction

Since the reference frames of previous images are down sized, the received motion vectors pointing to these frames may also be translated according to the conversion ratio. The following describes the motion translation for the luminance block, for example, in the horizontal direction. One skilled in the art would easily extend the following discussion to motion translation in the vertical direction if used. Denoting x and y as the current macroblock address in the original image frame, Dx as the horizontal decimation factor and $mv_x$ as the half pixel horizontal motion vector of the original image frame, the address of the top left pixel of the motion block in the original image frame, denoted as XH in the half pixel unit, is given by (1):

$$XH = 2x + mv_x \quad (1)$$

The pixel corresponding to the motion block starts in the down-sampled image, whose address is denoted as x* and y* in the pixel unit given in (2).

$$x^* = \frac{XH}{2 \cdot Dx}; \quad y^* = y \quad (2)$$

Because the exemplary filter 216 and Down Sampling Processdor 232 only reduced the horizontal components of the image, the vertical component of the motion vector is not affected. For the chrominance, the motion vector is a half of a luminance motion vector in the original picture. Therefore, definitions for translating the chrominance motion vector may also use the two equations (1) and (2).

Motion prediction is done by a two step process: first, pixel accuracy motion estimation in the original image frame may be accomplished by upsampling of down-sampled image frame in the Up Sampling Processor 226 of FIGS. 2A and 2B, then the half pixel Generator 228 performs a half pixel motion estimation by averaging of nearest pixel values.

Subpixels are interpolated, for example, by use of an upsampling polyphase filter in the Up Sampling Processor 226, which gives a motion prediction in the high resolution picture. The motion prediction is added to an output of IDCT processor 218. Since the output values of the Adder 230 correspond to an image in the high resolution format, these values may be downsampled for display on a display having a lower resolution. Downsampling in the Down Sampling processor 232 is substantially equivalent to subsampling of an image frame, but adjustments may be made based upon the conversion ratio. For example, in the case of 3:1 downsampling, the number of horizontally downsampled pixels are 6 or 5 for each input macroblock, and the first downsampled pixels are not always first pixel in the input macroblock.

After acquiring the correct motion prediction block from the downsampled image, upsampling is needed to get the corresponding prediction block in the high resolution picture. Consequently, subpixel accuracy in motion block prediction is desirable in the down sampled picture. For example, using 3:1 decimation, it is desirable to have ⅓ (or ⅙) subpixel accuracy in the motion prediction. The subpixel which is a first pixel required by the motion vector, in addition to the downsampled motion block, is determined. Then, subsequent subpixel positions are determined using modulo arithmetic as described in the following. The subpixel positions are denoted as $x_s$ as given in (3).

$$X_s = \left(\frac{XH}{2}\right) \% (Dx) \quad (3)$$

Figure 3A:
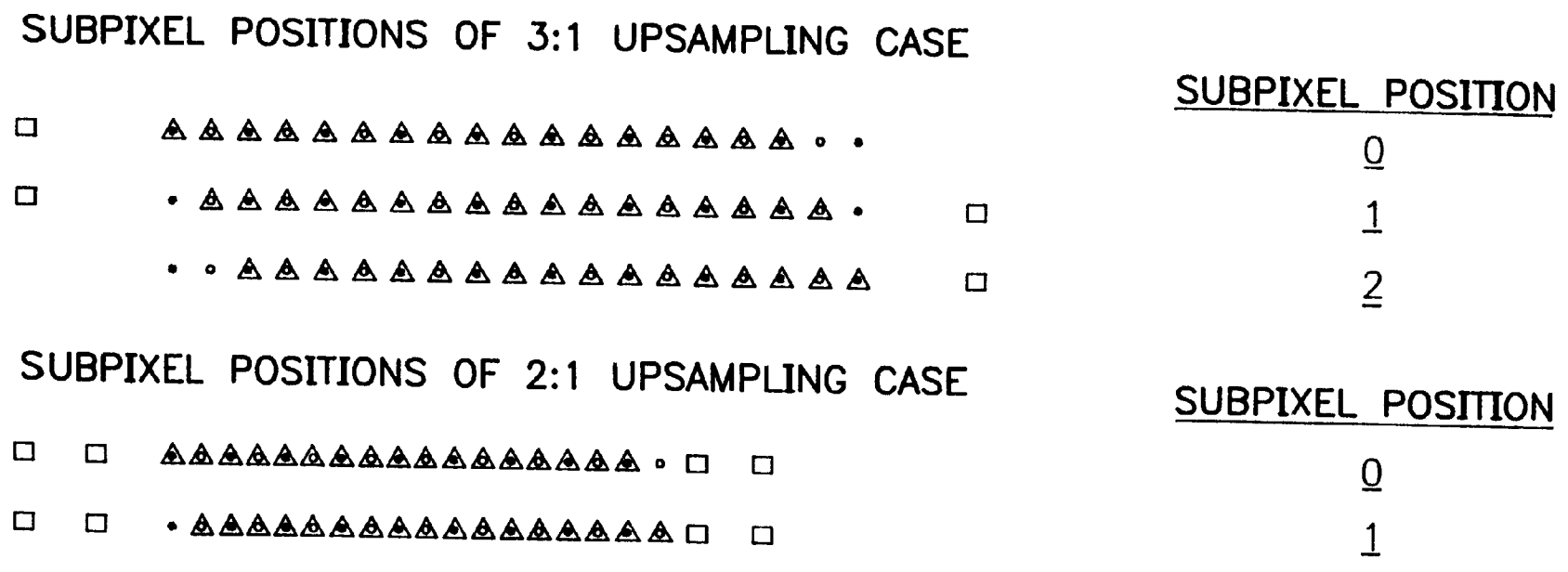

For example, the ranges of $x_s$ are 0, 1, 2 for 3:1 upsampling and 0, 1 for 2:1 upsampling. FIG. 3A shows subpixel positions and corresponding 17 predicted pixels for the 3:1 and 2:1 examples, and Table 1 gives the legend for FIG. 3A.

Table 1

| Symbol | Pixel |
|---|---|
| ● | Downsampled Pixel |
| ○ | Upsampled Pixel |
| Δ | Prediction Pixel |
| □ | Extra Right and Left Pixels for Upsampling |

As previously described, the upsampling filters may be upsampling polyphase filters, and Table 2A gives characteristics of these upsampling polyphase interpolation filters.

TABLE 2A

|  | 3:1 Upsampling | 2:1 Upsampling |
|---|---|---|
| Number of Polyphase Filters | 3 | 2 |
| Number of Taps | 3 | 5 |
| Maximum number of horizontal downsampled pixels | 9 | 13 |

Next two tables, Table 2B and Table 2C, show polyphase filter coefficients for the exemplary 3:1 and 2:1 upsampling polyphase filters.

TABLE 2B

3:1 Upsampling Filter

|  | Phase 0 | Phase 1 | Phase 2 |
|---|---|---|---|
| Double Precision | −0.1638231735591 | 0.0221080691070 | 0.3737642376078 |
|  | 0.7900589359512 | 0.9557838617858 | 0.7900589359512 |
|  | 0.3737642376078 | 0.0221080691070 | −0.1638231735591 |
| Fixed Point (9 bits) | −0.1640625 (−42) | 0.0234375 (6) | 0.3750000 (96) |
|  | 0.7890625 (202) | 0.95703125 (244) | 0.7890625 (202) |
|  | 0.3750000 (96) | 0.0234375 (6) | −0.1640625 (−42) |

TABLE 2C

| | 2:1 Unsampling Filter | |
|---|---|---|
| | Phase 0 | Phase 1 |
| Double Precision | 0.0110396839260 | −0.1433363887113 |
| | 0.0283886402920 | 0.6433363887113 |
| | 0.9211433515636 | 0.6433363887113 |
| | 0.0283886402920 | −0.1433363887113 |
| | 0.0110396839260 | 0.0000000000000 |
| Fixed Point (9 bits) | 0.01718750 (3) | −0.14453125 (−37) |
| | 0.02734375 (7) | 0.64453125 (165) |
| | 0.92187500 (236) | 0.64453125 (165) |
| | 0.02734375 (7) | −0.14453125 (−37) |
| | 0.01718750 (3) | 0.00000000 (0) |

In a fixed point representation, the numbers in parenthesis of Table 2B and Table 2C are 2's complement representations in 9 bits with the corresponding double precision numbers are on the left. Depending upon the subpixel position of the motion prediction block in the downsampled reference image frame, one corresponding phase of the polyphase interpolation filter is used. Also, for the exemplary embodiment more pixels on the left and right are needed to interpolate 17 horizontal pixels in the original downsampled image frame. For example, in the case of 3:1 decimation, there are a maximum of 6 horizontally downsampled pixels for each input macroblock. However, when upsampling, 9 horizontal pixels are needed to produce the corresponding motion prediction block values because an upsampling filter requires more left and right pixels outside of the boundary for the filter to operate. Since the exemplary embodiment employs half pixel motion estimation, 17 pixels are needed to get 16 half pixels which are the average values of nearest two pixel samples. A half pixel motion generator takes care of this. Table 3 illustrates mapping between subpixel positions and polyphase filter elements, and a number of left pixels which are needed in addition for the upsampling process.

TABLE 3

| | Sub Pixel Position | Polyphase | No. of Extra Left Pixels | Coordinate Change |
|---|---|---|---|---|
| 3:1 Upsampling | 0 | 1 | 1 | x −> x − 1 |
| | 1 | 2 | 1 | x −> x − 1 |
| | 2 | 0 | 0 | |
| 2:1 Upsampling | 0 | 0 | 2 | x −> x − 2 |
| | 1 | 1 | 2 | x −> x − 2 |

Figure 3B:
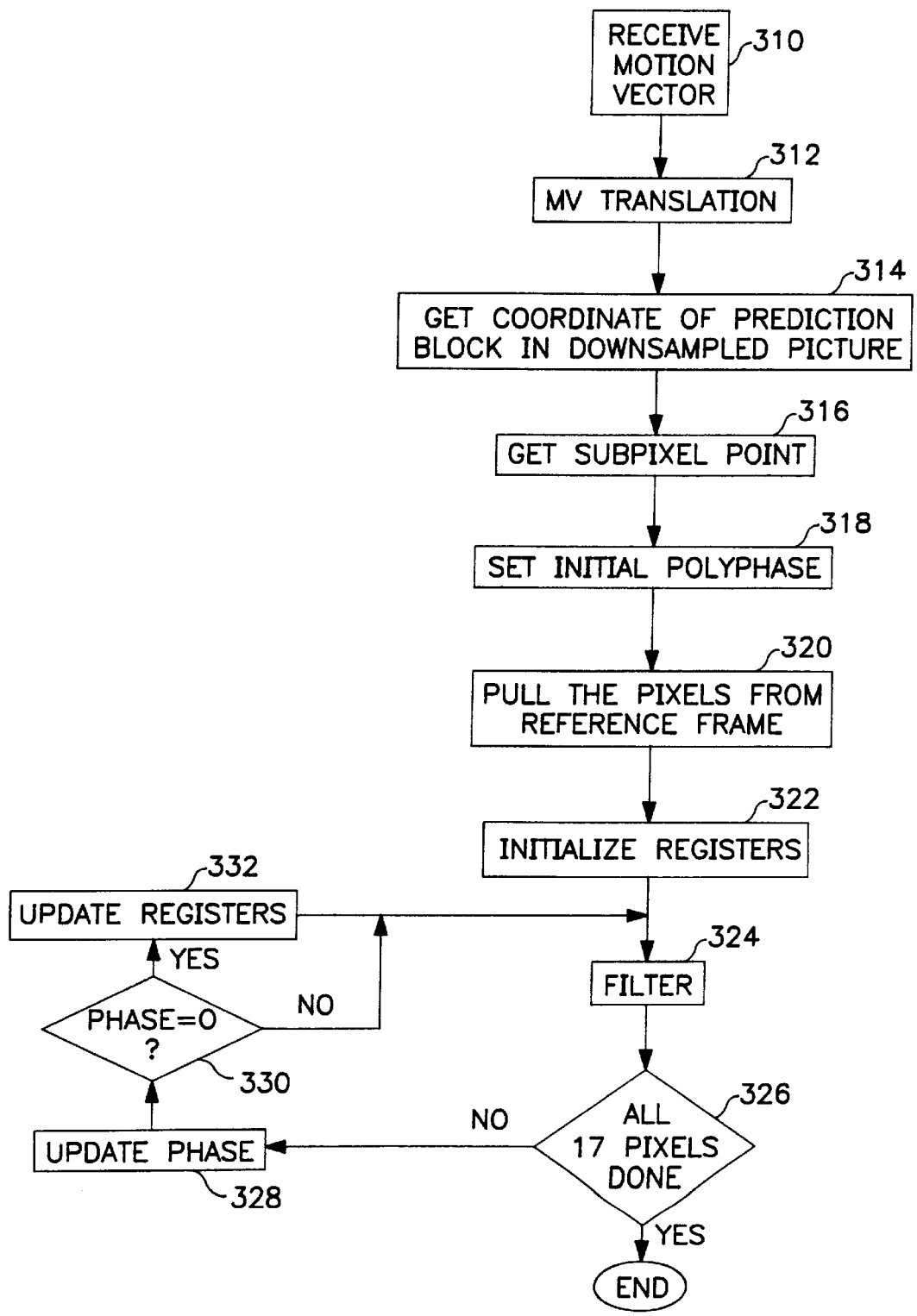
FIG. 3B shows the upsampling process which is performed for each row of an input macroblock for an exemplary embodiment of the present invention.

FIG. 3B summarizes the upsampling process which is performed for each row of an input macroblock. First, in step 310, the motion vector for the block of the input image frame being processed is received. At step 312, the motion vector is translated to correspond to the downsampled reference frame in memory. At step 314, the scaled motion vector is used to retrieve the coordinates of the prediction block stored in frame memory. At step 316 the Subpixel point for the block is determined and the initial polyphase filter values for upsampling are then retrieved at step 318. The identified pixels for the prediction block of the stored downsampled reference frame are then retrieved from memory at step 320.

Before the first pass at the filtering step 324, the registers should be initialized at step 322, which for the exemplary embodiment is loading the registers with the initial 3 or 5 pixel values. Then, after filtering step 324, the process determines at step 326 whether all pixels have been processed, which for the exemplary embodiment is 17 pixels. If all pixels have been processed, the upsampled block is complete. If all pixels have not been processed, the phase is updated at step 328, and the phase is checked, for the 0 value (0 corresponding to the last polyphase filter process required). If the phase is not zero, the registers must be updated for the next set of polyphase filter coefficients. Updating registers step 332 then simply updates the phase value to 0, 1, and 2 for the filter loop period for exemplary 3:1 upsampling and to 0, and 1 for the filter loop period for 2:1 upsampling. In an exceptional case where the left-most pixel is outside of the block boundary, a previous pixel value may be repeated.

c) DCT Domain Filtering Employing Weighting of DCT Coefficients

The exemplary embodiment of the present invention includes the DCT filter 216 processing the DCT coefficients in the frequency domain, which replaces a lowpass filter in the spatial domain. There are several advantages in DCT domain filtering instead of spatial domain filtering for DCT coded pictures, such as contemplated by the MPEG or JPEG standards. Most notably, a DCT domain filter is computationally more efficient and requires less hardware than a spatial domain filter applied to the spatial pixel sample values. For example, a spatial filter having N taps may use as many as N multiplications and additions for each spatial pixel sample value. This compares to only one multiplication in the DCT domain filter.

The simplest DCT domain filter is a truncation of the high frequency DCT coefficients. However, truncation of high frequency DCT coefficients does not result in a smooth filter and has drawbacks such as "ringing" near edges in the decoded picture. The DCT domain lowpass filter of the exemplary embodiment of the present invention is derived from a block mirror filter in the spatial domain. The filter coefficient values for the block mirror filter are, for example, optimized by numerical analysis in the spatial domain, and these values are then converted into coefficients of the DCT domain filter.

Although the exemplary embodiment shows DCT domain filtering in only the horizontal direction, DCT domain filtering can be done in either horizontal or vertical direction or both by combining horizontal and vertical filters.

d) Derivation of the DCT Domain Filter Coefficients

One exemplary filter of the present invention is derived from two constraints: first, the filter processes image data on a block by block basis for each block of the image without using information from blocks of previous pictures; and second, the filter reduces visibility of block boundaries which occur when the filter processes boundary pixel values.

According to the first constraint, in the DCT based compression of an MPEG image sequence, for example, N×N blocks of DCT coefficients yield N×N blocks of spatial pixel values. Consequently, the exemplary embodiment of the present invention implements a DCT domain filter which only processes blocks of the currently received picture.

According to the second constraint, if the filter is simply applied to a block of spatial pixel values, there is a transition of filtering on the block boundary which is caused by an insufficient number spatial pixel values beyond the boundary to fill the residual of the filter. That is to say, coefficient values at the edge of a block cannot be properly filtered because the N-tap filter has values for only N/2 taps, the remaining values are beyond the boundary of the block. Several methods of supplying pixel values exist: 1) repeat a predetermined constant pixel value beyond a boundary; 2) repeat the same pixel value as the boundary pixel value; and 3) mirror the pixel values of the block to form vertical previous and subsequent blocks of pixel values adjacent to the processed block. Without a prior information on the contents of the previous or subsequent block, the mirroring method of repeating pixel values is considered as a preferred method. Therefore, one embodiment of the present invention employs this mirroring method for the filter and is termed a "block mirror filter."

The following describes an exemplary embodiment which implements a horizontal block mirror filter that lowpass filters 8 input spatial pixel sample values of a block. If the size of input block is an 8×8 block matrix of pixel sample values, then a horizontal filtering can be done by applying the block mirror filter to each row of 8 pixel sample values. It will be apparent to one skilled in the art that the filtering process can be implemented by applying the filter coefficients column wise of the block matrix, or that multidimensional filtering may be accomplished by filtering of the rows and then filtering the columns of the block matrix.

Figure 4:
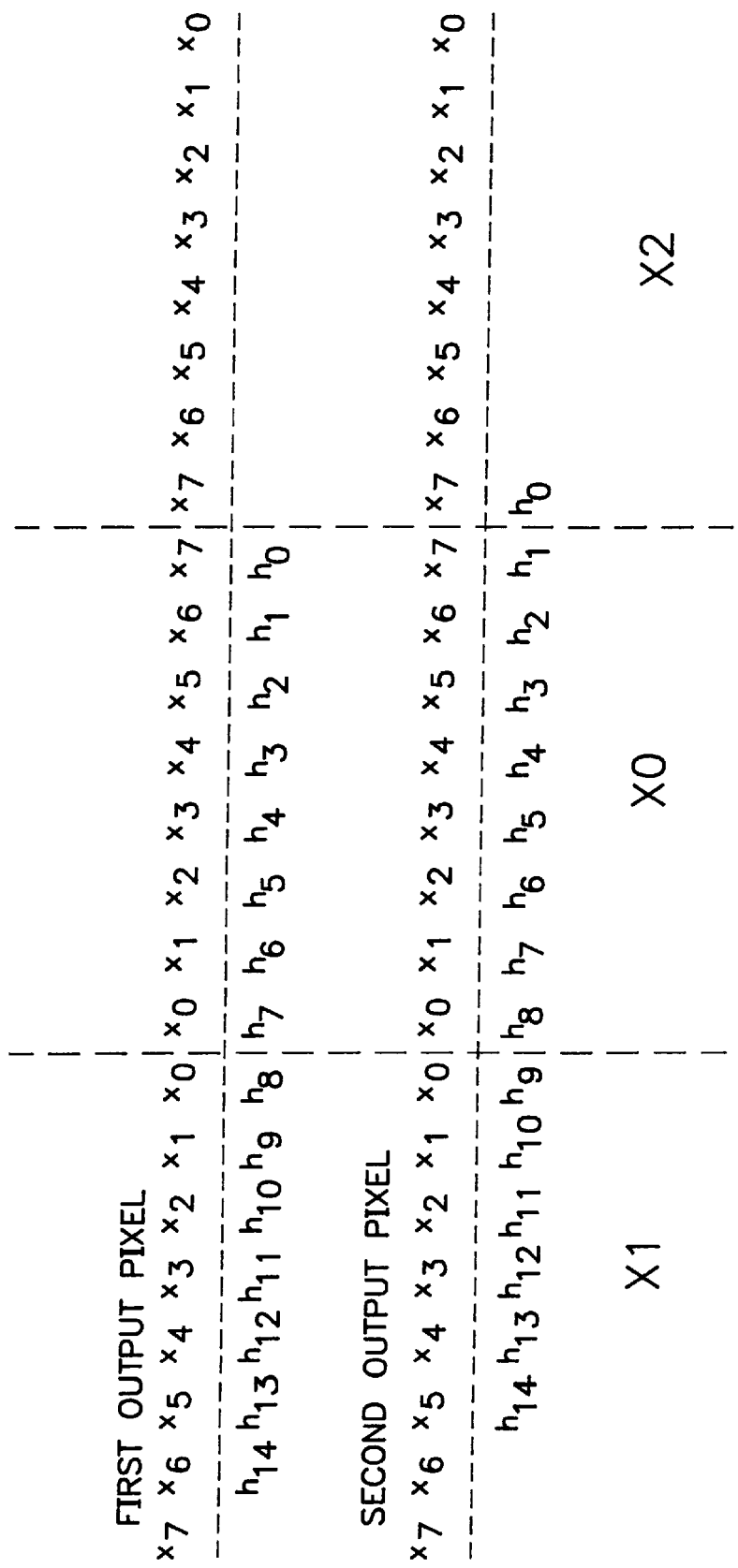
FIG. 4 illustrates the multiplication pairs for the first and second output pixel values of an exemplary embodiment of a block mirror filter.

FIG. 4 shows the correspondence between the input pixel values $x_0$ through $x_7$ (group X0) for an exemplary mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filer tap values with the corresponding pixel sample values. FIG. 4 illustrates the multiplication pairs for the first and second output pixel values.

The following shows that the block mirror filter in the spatial domain is equivalent to DCT domain filter. The mirror filtering is related to a circular convolution with 2N points (N=8).

Define the vector x' as shown in equation (4).

$$x'(n)=x(n)+x(2N-1-n); 0<=n<=2N-1 \quad (4)$$

In the case of N=8, x'=(x0, x1, x2, x3, x4, x5, x6, x7, x7, x6, x5, x4, x3, x2, x1, x0)

Rearranging the filter tap values $h_0$ through $h_{14}$, and denoting the rearranged values by h' h'=(h7, h8, h9, h10, h11, h12, h13, h14, 0, h0, h1, h2, h3, h4, h5, h6)

Therefore, the mirror filtered output y(n) is a circular convolution of x'(n) and h'(n) which is given by equation (5).

$$y(n) = x'(n) \otimes h'(n) \quad (5)$$

Which is equivalent to equation (6).

$$y(n) = \sum_{k=0}^{2N-1} x'[n-k] \cdot h'(n) \quad (6)$$

where x'[n−k] is a circular modulo of x'(n) and
x'[n]=x'(n) for n>=0
x'[n]=x'(n+2N) for n<0.

The inventor has determined that the circular convolution in the spatial domain shown in equation (5) corresponds to the scalar multiplication in the Discrete Fourier Transform (DFT) domain. Defining Y(k) as the DFT of y(n), then equation (5) becomes equation (7) in the DFT domain.

$$Y(k)=X'(k) \cdot H'(k) \quad (7)$$

where X'(k) and H'(k) are the DFTs of x'(n) and h'(n) respectively.

Equations (4) through (7) are valid for a filter with a number of taps less than 2N. In addition, the filter is limited to be a symmetric filter with odd number of taps, with these constraints H'(k) is a real number. Therefore, X'(k), the DFT of x'(n), can be weighed with a real number H'(k) in the DFT frequency-domain instead of 2N multiplication and 2N addition operations in the spatial domain to implement the filtering operation. The values of X'(k) are very closely related to the DCT coefficients of the original N-point x(n), because an N-point DCT is obtained by the 2N-point DFT of x'(n) which is the joint sequence composed of x(n) and its mirror, x(2N−1−n).

The following describes the derivation of the DFT coefficients of the spatial filter, H'(k), by assuming a symmetric filter having an odd number of taps, 2N−1, which is h(n)=h(2N−2−n), and equivalently h'(n)=h'(2N−n) and h'(N)=0. Define H'(k) as in equation (8).

$$H'(k) = \sum_{n=0}^{2N-1} h'(n) \cdot W_{2N}^{kn} = h'(0) + 2 \sum_{n=1}^{N-1} h'(n) \cdot \cos \frac{\pi k n}{N} \quad (8)$$

where $W_{2N}^{kn}=\exp\{-2\pi kn/(2N)\}$; and H'(k)=H'(2N−k).

The inventor has determined that the 2N-point DFT of x'(n), X'(k), can be expressed by its DCT coefficients in equation (9).

$$X'(k) = \sum_{n=0}^{2N-1} x'(n) \cdot W_{2N}^{kn} = W_{2N}^{-k/2} \cdot \sum_{n=1}^{N-1} 2x(n) \cdot \cos \frac{\pi k(2n+1)}{2N} \quad (9)$$

whereas the DCT coefficient of x(n), C(k), is given by equation (10).

$$C(k) = \sum_{n=1}^{N-1} 2x(n) \cdot \cos \frac{\pi k(2n+1)}{2N} \quad (10)$$

$$= W_{2N}^{k/2} \cdot X'(k) \quad \text{for} \quad 0 \leq k \leq N-1$$

and C(k)=0 elsewhere.

The values of X'(k), the DFT coefficients of x'(n), can be expressed by C(k), the DCT coefficients of x'(n) by the matrix of equation (11).

$$X'(k) = \begin{bmatrix} W_{2N}^{-k/2} \cdot C(k) & \text{for} & k \leq N-1 \\ 0 & \text{for} & k = N \\ -W_{2N}^{-k/2} \cdot C(2N-k) & \text{for} & N+1 \leq k \leq 2N-1 \end{bmatrix} \quad (11)$$

The original spatial pixel sample values, x(n), can be also obtained by IDCT (Inverse Discrete Cosine Transformation) shown in equation (12).

$$x(n) = \frac{1}{N} \sum_{k=0}^{N-1} \alpha(k) \cdot C(k) \cdot \cos \frac{\pi k(n+1/2)}{N} \quad (12)$$

where α(k)=½ for k=0 and 1 otherwise.

The values of y(n) for 0<=n<=N−1, are obtained by IDFT of X'(k)H'(k) given in (13):

$$y(n) = \frac{1}{2N} \cdot \left\{ \sum_{k=0}^{2N-1} X'(k) \cdot H'(k) \cdot W_{2N}^{-kn} \right\} \quad (13)$$

$$= \frac{1}{2N} \left\{ \sum_{k=0}^{N-1} C(k) \cdot H'(k) \cdot W_{2N}^{-k(n+1/2)} + \sum_{k=N+1}^{2N-1} -C(2N-k) \cdot H'(2N-k) \cdot W_{2N}^{-k(n+1/2)} \right\}$$

$$= \frac{1}{N} \sum_{k=0}^{N-1} \alpha(k) \cdot \{C(k) \cdot H'(k)\} \cdot \cos \frac{\pi k(n+1/2)}{N}$$

The values y(n) of equation (13) are the spatial values of the IDCT of C(k)H'(k). Therefore, the spatial filtering can be replaced by the DCT weighting of the input frequency-domain coefficients representing the image block with H'(k) and then performing the IDCT of the weighted values to reconstruct the filtered pixel values in the spatial domain.

e) Exemplary Embodiment of the Block Mirror Filter

One embodiment of the exemplary block mirror filtering of the present invention is derived as by the following steps: 1) a one dimensional lowpass symmetric filter is chosen with an odd number of taps, which is less than 2N taps; 2) the filter coefficients are increased to 2N values by padding with zero's; 3) the filter coefficients are rearranged so that the original middle coefficient goes to the zeroth position by a left circular shift; 4) the DFT coefficients of the rearranged filter coefficients are determined; 5) the DCT filter coefficients are multiplied with the real number DFT coefficients of the input block; and 6) perform the inverse discrete cosine transform (IDCT) of the filtered DCT coefficients is performed by multiplying by IDCT coefficients to provide a block of lowpass-filtered pixels prepared for decimation.

The cutoff frequency of the lowpass filter is determined by the decimation ratio. For one exemplary embodiment, the cutoff frequency is π/3 for a 3:1 decimation and π/2 for a 2:1 decimation, where π is half of sampling frequency.

A DCT domain filter in MPEG and JPEG decoders allows memory requirements to be reduced because the inverse quantizer and IDCT processing of blocks already exists in the decoder of the prior art, and only the additional scalar multiplication of DCT coefficients by the DCT domain filter is required. Therefore, a separate DCT domain filter block multiplication is not physically required in a particular implementation; another embodiment of the present invention simply combines the DCT domain filter coefficients with the IDCT processing coefficients.

For the exemplary down conversion system of the present invention, the horizontal filtering and decimations of the DCT coefficients were considered; and the following are two exemplary implementations for:

1. 1920H by 1080V interlace to 640 by 1080 interlace conversion (Horizontal 3:1 decimation).
2. 1280H by 720V progressive to 640 by 720 progressive conversion (Horizontal 2:1 Decimation)

Table 4 shows the DCT block mirror filter (weighting) coefficients; in Table 4 the numbers in the parenthesis are 10 bit 2's complementary representations. The "*" of Table 4 implies an out of bound value for the 10 bit 2's complement representation because the value is more than 1; however, as is known by one skilled in the art, the multiplication of the column coefficients of the block by the value indicated by the * can be easily implemented by adding the coefficient value to the coefficient multiplied by the fractional value (remainder) of the filter value.

TABLE 4

|  | 3:1 Decimation | 2:1 Decimation |
| --- | --- | --- |
| H[0] | 1.000000000000000 (511) | 1.0000000000000000 (511) |
| H[1] | 0.986934590759779 (505) | 1.0169628157945179 (*) |
| H[2] | 0.790833583171840 (405) | 1.0000000000000000 (511) |
| H[3] | 0.334720213357461 (171) | 0.82247656390475166 (421) |
| H[4] | −0.0323463361027473 (−17) | 0.46728234862006007 (239) |
| H[5] | −0.0377450036954524 (−19) | 0.10634261847436199 (54) |
| H[6] | −0.0726889747390758 (37) | −0.052131780559049545 (−27) |
| H[7] | 0.00954287167337307 (5) | −0.003489737967467715 (−2) |

These horizontal DCT filter coefficients weight each column in the 8×8 block of DCT coefficients of the encoded video image. For example, the DCT coefficients of column zero are weighted by H[0], and the DCT coefficients of first column is weighted by H[1] and so on.

The above discussion illustrates a horizontal filter implementation using one-dimensional DCTs. As is known in the digital signal processing art, such processing can be extended to two-dimensional systems. For a two-dimensional system, the input sequence is now represented as a matrix of values, showing the sequence to be periodic in the column sequence with period M, and periodic in the row sequence with period N, N and M being integers. A two-dimensional DCT can be implemented as a one dimensional DCT performed on the columns of the input sequence, and then a second one dimensional DCT performed on the rows of the DCT processed input sequence. Also, as is known in the art, a two-dimensional IDCT can be implemented as a single process.

FIG. 5 shows an exemplary implementation of the filter for down-conversion for a two-dimensional system processing the horizontal and vertical components implemented as cascaded one-dimensional IDCTs. As shown in FIG. 5, the DCT Filter Mask 216 and IDCT 218 of FIG. 2 may be implemented by a Vertical Processor 510, containing a Vertical DCT Filter 530 and a Vertical IDCT 540, and a Horizontal Processor 520, containing a horizontal DCT Filter and horizontal IDCT which are the same as those implemented for the vertical components. Since the filtering and IDCT processes are linear, the order of implementing these processes can be rearranged (e.g, horizontal and vertical DCT filtering first and horizontal and vertical IDCTs second, or vise-versa, or Horizontal Processor 520 first and Vertical Processor 510 (second)).

In the particular implementation shown in FIG. 5, the Vertical Processor 510 is followed by a block Transpose Operator 550, which switches the rows and columns of the block of vertical processed values provided by the Vertical Processor. This operation allows greater efficiency of computation by preparing the block for processing by the Horizontal Processor 520.

The encoded video block, for example an 8×8 block of matrix values, is received by the Vertical DCT filter 530, which weights each row entry of the block by the DCT filter values corresponding to the desired vertical decimation. Next, the Vertical IDCT 540 performs the inverse DCT for the vertical components of the block. As described previously, since both processes simply perform a matrix multiplication and addition, the DCT filter coefficients can be combined with the vertical IDCT coefficients for a single matrix multiplication and addition operation. The Vertical Processor 510 then provides the vertical processed blocks to the Transpose Operator 550, which provides the transposed block of vertical processed values to the Horizontal Processor 520. The Transpose Operator 550 is not necessary unless the IDCT operation is only done by row or by column. The Horizontal Processor 520 performs the weighting of each column entry of the block by the DCT filter values corresponding to the desired horizontal filtering at the same time that it performs the inverse DCT for the horizontal components of the block.

f) Down Sampling

Figure 6A:
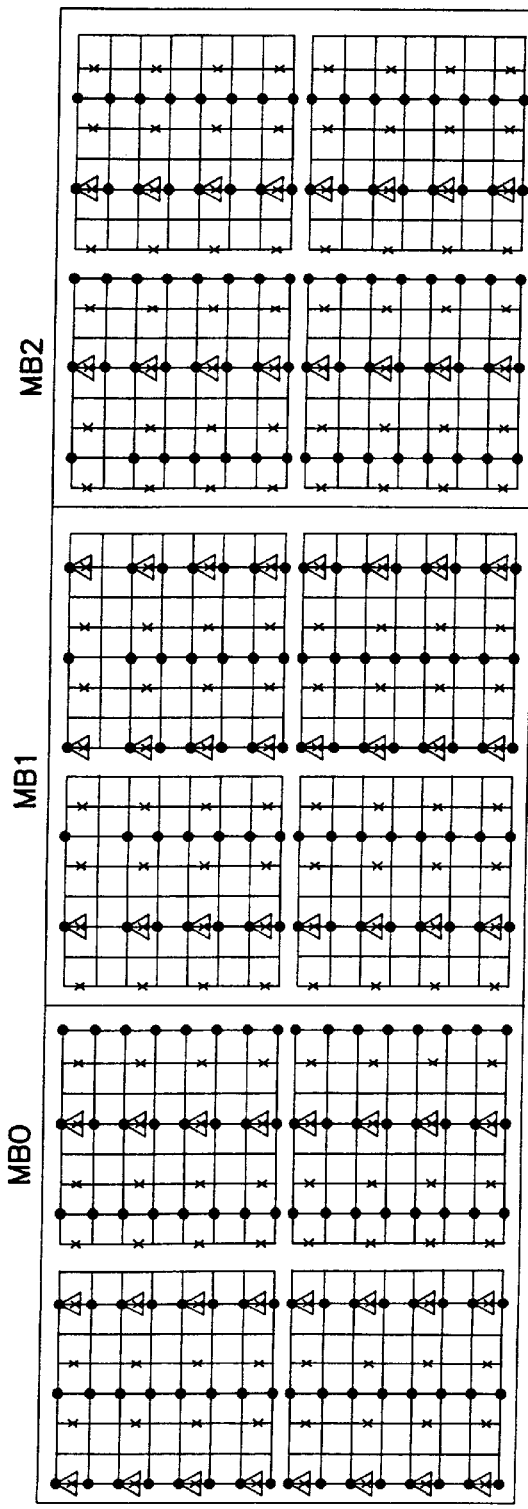
FIG. 6A shows the input and decimated output pixels for 4:2:0 video signal using 3:1 decimation.
Figure 6B:
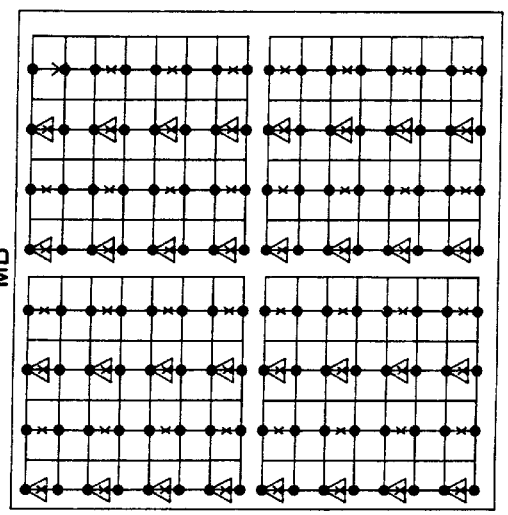
FIG. 6B shows the input and decimated output pixels for 4:2:0 video signal using 2:1 decimation.

Down sampling is accomplished by the Down Sampling process 232 to reduce the number of pixels in the down-converted image. FIG. 6A shows the input and decimated output pixels for 4:2:0 chrominance type for 3:1 decimation. FIG. 6B shows the input and decimated output pixels for 4:2:0 chrominance type 2:1 decimation. Table 5 gives the legend identification for the Luminance and Chrominance pixels of FIG. 6A and FIG. 6B. The pixel positions before and after the down conversion of FIGS. 6A and 6B are the interlaced (3:1 decimation) and progressive (2:1 decimation) cases respectively

TABLE 5

| Symbol | Pixel |
| --- | --- |
| + | Luminace Before Decimation |
| x | Chrominance Before Decimation |
| ● | Luminance After decimation |
| Δ | Chrominance After Decimation |

For down sampling of the interlaced image, which may be the conversion from a 1920 by 1080 pixel size to a 640 by 1080 pixel size, every third pixel is decimated on the horizontal axis. For the exemplary 3:1 decimation, there are three different macroblock types after the down conversion process. In FIG. 6A, original macroblocks were denoted by MB0, MB1, MB2. The down sampled luminance pixels in MB0 start at the first pixel in the original macroblock, but in MB1 and MB2 the down-sampled pixels start at the third and the second pixels. Also the number of down-sampled pixels in each macroblock are not the same. In MB0, there are 6 down-sampled pixels horizontally, but 5 pixels in MB1 and MB2. These three MB types are repeating, therefore Modulo 3 arithmetic is to be applied. Table 6 summarizes the number of downsampling pixels and offsets for each input macroblock MB0, MB1, MB2.

TABLE 6

|  | MB0 | MB1 | MB2 |
| --- | --- | --- | --- |
| No. of Down Sampled Luminance Pixels | 6 | 5 | 5 |
| No. of Down Sampled Chrominance Pixels | 3 | 3 | 2 |
| Offset of 1st Down Sampled Luminance Pixel | 0 | 2 | 1 |
| Offset of 1st Down Sampled Chrominance Pixel | 0 | 1 | 2 |

For downsampling of the progressive format image the luminance signal is subsampled for every second sample horizontally. For the chrominance signal, the down-sampled pixel is just a half pixel below the original pixel.

f) Display Conversion

Display conversion of the downsampled image frames is required for displaying the image in a particular format. As noted previously, the Display Conversion block 280 shown in FIG. 2A adjusts the down converted and down sampled images for display on the lower resolution screen.

Referring to FIG. 2A, Display Conversion section 280 includes VPF 282 which, for the exemplary embodiment, is a vertical line interpolation processor implemented as a programmable polyphase vertical filter, and HZPF 284 which, for the exemplary embodiment, is a horizontal line interpolation processor implemented as a programmable horizontal polyphase filter. The filters are programmable, which is a design option in order to accommodate display conversion for a number of display formats.

As shown in FIG. 2A, four lines of downsampled pixel data enter the VPF 282 in raster order. For the exemplary embodiment this data includes luminance (Y) and chrominance (U and V) pixel pairs which enter VPF 282 32 bits at a time. VPF 282 filters the four lines of data into one line and passes this line to the HZPF 284 as 32 bit values each containing luminance and chrominance data, and HZPF 284 then generates the correct number of pixels to match the desired raster format.

Figure 7A:
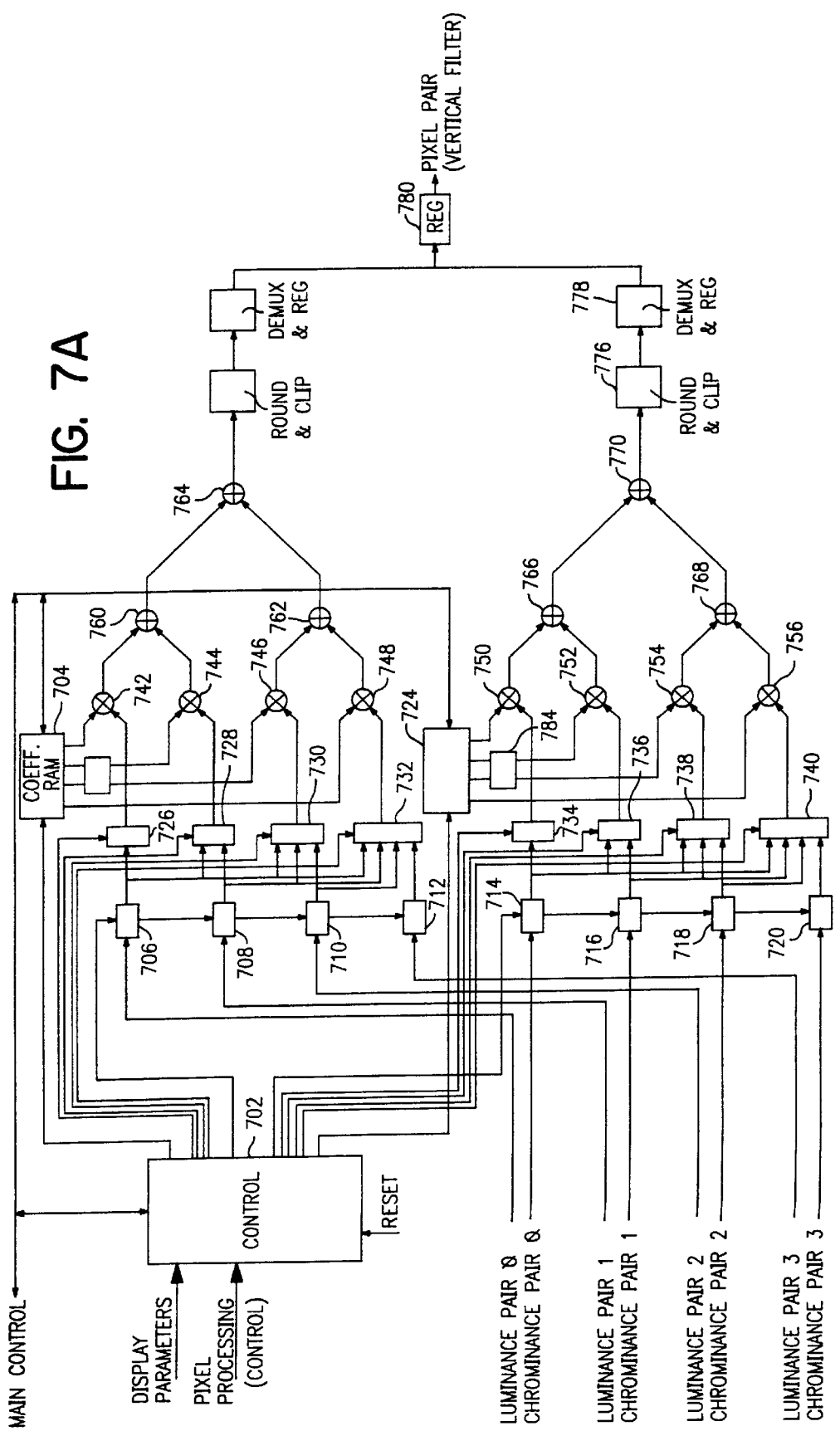
FIG. 7A is a high level block diagram illustrating a vertical programmable filter of one embodiment of the present invention.

FIG. 7A is a high level block diagram illustrating the VPF 282 of one embodiment of the present invention. In the following, the VPF 282 is described as processing pairs of input pixels (luminance Y and chrominance U and V) to produce a pair of output pixels, which facilitates processing of the 4:2:0 format because this allows the color pixels to be associated with the corresponding luminance pixels. One skilled in the art, however, would realize that only a single pixel, or multiple pixels can be so processed. In addition, the VPF 282 as described produces lines in the progressive format. In another embodiment employing a dual output and supporting an interlaced format, a second VPF 282 can be added.

Referring to FIG. 7A, VPF 282 includes a VPF Controller 702; first muliplexer network including Luminance Pixel MUXs (LP MUXs) 706, 708, 710, and 712 and Chrominance Pixel MUXs (CP MUXs) 714, 716, 718, and 720; second multiplexer network including Luminance Filter MUXs (LF MUXs) 726, 728, 730 and 732 and Chrominance Filter MUXs (CF MUXs) 734, 736, 738 and 740; Luminance Coefficient RAM 704; Chrominance Coefficient RAM 724; Luminance Coefficient Multipliers 742, 744, 746, and 748; Chrominance Coefficient Multipliers 750, 752, 754, and 756; Luminance Adders 760, 762 and 764; Chrominance Adders 766, 768 and 770; Round and Clip processors 772 and 776; Demux/Registers 774 and 778; and Output Register 780.

The operation of the VPF 282 is now described. Vertical resampling is accomplished with two 4-Tap polyphase filters, one for the Luminance pixels and one for the Chrominance pixels. The following details operation of the filter for the Luminance pixels only, since the operation for the Chrominance pixels is similar, but points out those differences in the paths as they occur. Vertical filtering of Luminance pixels can use up to 8 phases in the 4-Tap polyphase filter and filtering of Chrominance pixels can use up to 16 phases in the 4-Tap polyphase filter for the exemplary embodiment. The VPF Controller 702, at the beginning of a field or frame, resets the vertical polyphase filter, provides control timing to the first and second multiplexer networks, selects coefficient sets from Luminance Coefficient RAM 704 and Chrominance Coefficient RAM 724 for the polyphase filter phases, and includes a counter for counting each line of the field or frame as it is processed.

The VPF Controller 702, in addition to coordinating the operation of the network of MUXs and the polyphase filters, keeps track of display lines by tracking the integer and fractional parts of the vertical position in the decoded picture. The integer part indicates which lines should be accessed and the fractional part indicates which filter phase should be used. Such use of modulo N arithmetic when calculating the fractional part allows, for example, for less than 16 phases to be used, which may be efficient for exact downsampling ratios such as 9 to 5. If the exact ratio is not required, the fractional part is truncated to one of the N phases used.

As shown in FIG. 7A, Luminance and Chrominance pixel pairs from the four Luminance and the four Chrominance lines are separated into a Chrominance and Luminance path. The 16 bit pixel pair data in the Luminance path may be further multiplexed into an 8-bit even (Y-even) and 8-bit odd (Y-odd) format by LP MUXs 706, 708, 710, and 712, and into an 8-bit U and 8-bit V format by CP MUXs 714, 716, 718 and 720. Then, the Luminance Filter MUXs 706, 708, 710 and 712 are used to repeat pixel values of a line at the top and a line at the bottom at the boundaries of a decoded image in order to allow pixel overlap in the polyphase filter operation.

Pixel pairs for the four lines corresponding to Luminance pixel information and Chrominance pixel information are then passed through the respective polyphase filters. Coefficients used by Multipliers 742, 744, 746 and 748 for weighting of pixel values for a filter phase are selected by the VPF Controller 702 based on a programmed up or down sampling factor. After combining the weighted Luminance pixel information in Adders 760, 762 and 764, the value is applied to the Round and Clip processor 772 which provides eight bit values (since the coefficient multiplication occurs with higher accuracy). DEMUX register 774 receives the first 8 bit value corresponding to an interpolated 8 bit even (Y-even) luminance value and second 8-bit value corresponding to the interpolated 8-bit odd (Y-odd) valuef, and provides a single vertical filtered luminance pixel having a 16 bit value. Register 780 collects and provides the vertical filtered pixels in the Luminance and Chrominance paths and provides them as vertically filtered 32 bit values containing a Luminance and Chrominance pixel pair.

FIG. 7B shows the spatial relationships between the coefficients and pixel sample space of the lines. The coefficients for the Luminance and Chrominance polyphase filter paths each have 40 bits allocated to each coefficient set, and there is one coefficient set for each phase. The coefficients are interpreted as fractions with a denominator of 512. The coefficients are placed in the 40-bit word from left to right, C0 to C3. C0 and C3 are signed ten bit 2's complement values, and C1 and C2 are 10 bits which have a given range, for example, from −256 to 767.

FIG. 7A includes an optional luminance coefficient adjustment 782 and chrominance coefficient adjustment 784. These coefficient adjustments 782 and 784 may be used, for example, to derive the 11 bit 2's complement number for C1 and C2. If bits 8 and 9(the most significant bit) are both 1, then the sign of the eleven bit number is 1 (negative), otherwise the value is positive. As shown in FIG. 7B, the Chrominance coefficients operate on the chrominance lines of the four input lines, but the Luminance coefficients operate on the even and odd Luminance Lines of the two central input lines.

FIG. 8A is a high level block diagram illustrating the HZPF 284 of one embodiment of the present invention. HZPF 284 receives a Luminance and Chrominance pixel information pair, which may be 32-bit data, from the VPD 282. The HZPF 284 includes a HZPF Controller 802; U chrominance latches 804; V chrominance latches 806; Y luminance latches 808; Selection MUXs 810; Horizontal filter Coefficient RAM 812; Combining network 814; Adding network 816; Round and Clip processor 818, DEMUX register 820 and output register 822. The following describes a single horizontal filter implementation as is used, for example, for resampling for a progressive display format. In another embodiment including a dual output and having a lower output transfer speed, a second horizontal filter is used to support an interlaced display format.

Horizontal resampling is accomplished by employing an 8 tap, 8 phase polyphase filter. Generation of display pixels is coordinated by the HZPF Controller 802 by tracking the integer and fractional parts of the horizontal position in the decoded and downsampled picture. The integer part indicates which pixels are to be accessed and the fractional part indicates which filter phase should be used. Using modulo N arithmetic when calculating the fractional part may allow for less than 8 phases to be used. For example, this may be useful if an exact downsampling ratio such as 9 to 5 is used. If the exact ratio is not used, the fractional part is truncated to one of the N phases. The HZPF 284 of the exemplary embodiment of the present invention filters pixel pairs, and may use alignment on even pixel boundaries to facilitate processing of the 4:2:0 formatted picture and to keep the U and V chrominance pixels (the color pixels) together with the corresponding Y luminance pixels.

The operation of the HZPF 284 is now described with reference to FIG. 8A. The HZPF Controller 802, at the beginning of a horizontal line, resets the horizontal polyphase filter, provides control timing to the first and second multiplexer networks, selects coefficient sets from Horizontal Coefficient RAM 812 for the U-chrominance, V-chrominance and Y-Luminance filter coefficients for each of the polyphase filter phases, and selects each set of U-chrominance, V-chrominance and Y-Luminance values for processing. In addition, when the horizontal position is near the left or right side of the line, the HZPF Controller 802 forces the edge pixel values to be repeated or set to 0 for use by the 8-tap polyphase filter.

The pixel data received from the VPF 282 is separated into Y luminance, U chrominance and V chrominance values, and these values are individually latched into U chrominance latches 804; V chrominance latches 806; Y luminance latches 808 for filtering. The HZPF Controller 802 then selects the Y-luminance, U-chrominance and V chrominance values by appropriate signal to the selection MUXs 810. In the exemplary embodiment, there are more Y-luminance values which may require additional latches in the Y luminance latches 808. At the same time, the HZPF Controller 802 selects the appropriate filter coefficients for the filter phase, and for the U or V chrominance or Y luminance values, based on a programmed upsampling or downsampling value by a control signal to Horizontal Filter Coefficient RAM 812.

Horizontal Filter Coefficient RAM 812 then outputs the coefficients to the respective elements of the Combining network 814 for multiplication with the input pixel values to produce weighted pixel values, and the weighted pixel values are combined in Adding network 816 to provide a horizontally filtered U or V chrominance or Y luminance value.

After combining the weighted pixel values in Adding network 816, the horizontally filtered pixel value is applied to the Round and Clip processor which provides eight bit values (since the coefficient multiplication occurs with higher accuracy). DEMUX register 820 receives a series of 8 bit values corresponding to a U chrominance value, an 8 bit even (Y-even) Y luminance value, an 8-bit V-chrominance value, and finally an 8-bit value corresponding to an 8-bit odd (Y-odd) Y luminance value; and the DEMUX register 820 multiplexes the values into a horizontally filtered luminance and chrominance pixel pair having a 32 bit value (YUYV). Register 822 stores and provides the pixel pair as a vertically and horizontally filtered 32 bit pixel luminance and chrominance pixel pair.

Figure 8B:
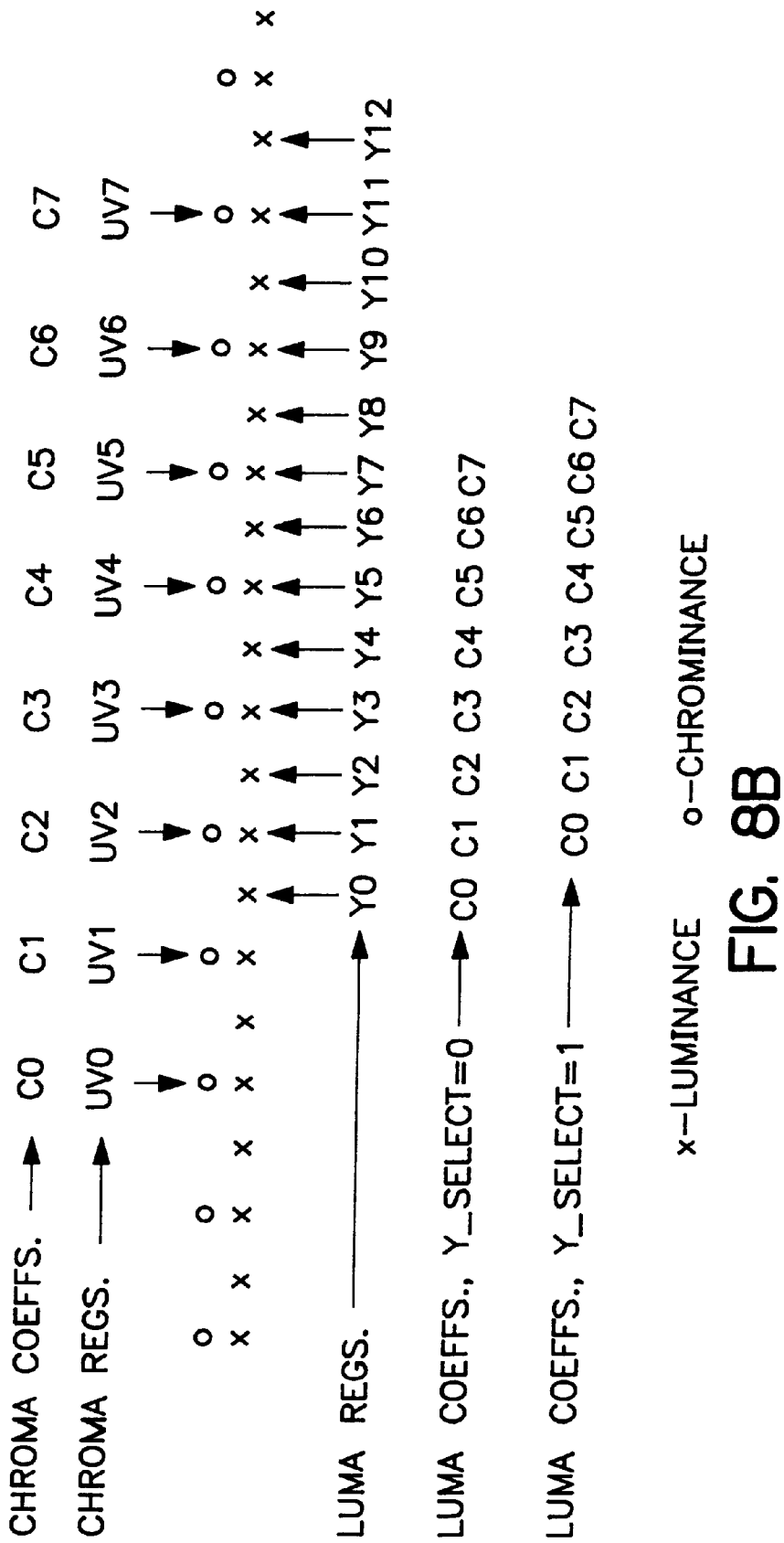
FIG. 8B illustrates spatial relationships between horizontal filtering coefficients and pixel sample values of one embodiment of the present invention.

FIG. 8B illustrates the spatial relationships between coefficients stored in Horizontal Filter Coefficient RAM 812 and used in the polyphase filter and the pixel sample values of the down sampled image for a horizontal line. The coefficients for the exemplary embodiment are placed in a 64 bit word from left to right, C0 to C7. The coefficients C0, C1, C6 and C7 are signed 7-bit 2's complement values, and C2 and C5 are signed 8-bit 2's complement and C3 and C4 are 10 bit values representing a range from −256 to 767. To derive the 11 2's complement number for C3 and C4, an adjustment may be required. If both bit 8 and bit 9 (the most significant bit) are 1, then the sign of the 11 bit number is 1 (negative), otherwise the value is 0 (positive). All coefficients can be interpreted as fractions with a denominator of 512.

In addition, the programmable capability of the HZPF 284 allows for a nonlinear horizontal scan. As shown in FIGS. 8C, 8D, 8E and 8F the resampling ratio of the HZPF 284 may be varied across the horizontal scan line and may be changed in piecewise linear fashion. In one configuration, at the beginning of the scan line, the resampling ratio increases (or decreases) linearly until a first point, where the value is held constant until a second point is reached where the resampling ratio decreases (or increases) linearly.

Figure 8C:
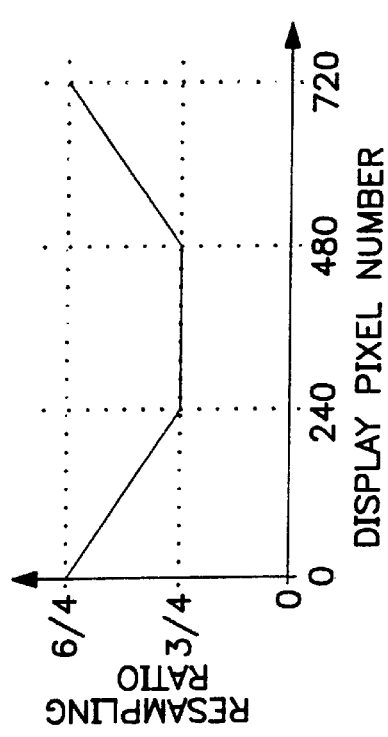
FIG. 8C shows a first ratio profile for mapping a 4:3 picture onto a 16:9 display.
Figure 8D:
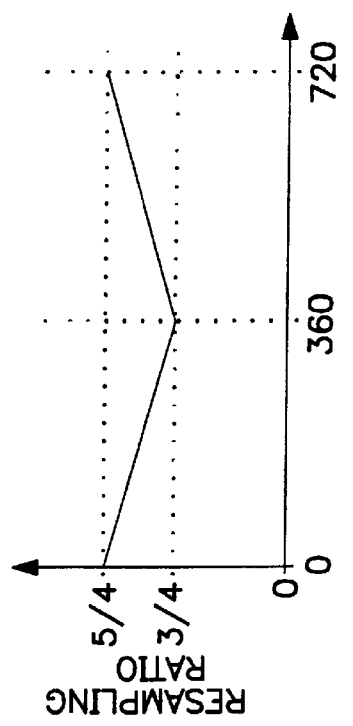
FIG. 8D shows a second ratio profile for mapping a 4:3 picture onto a 16:9 display.
Figure 8E:
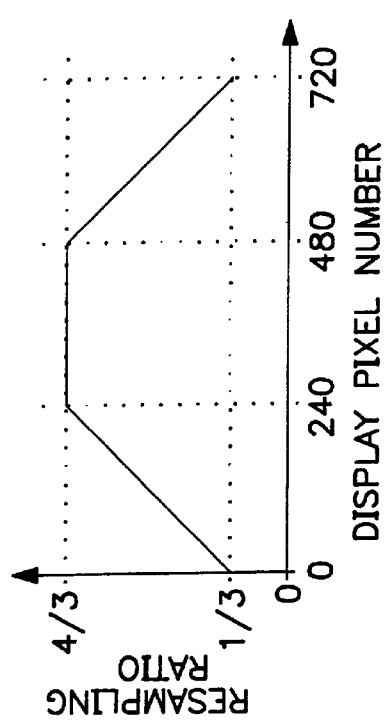
FIG. 8E shows a first ratio profile for mapping a 16:9 picture onto a 4:3 display.
Figure 8F:
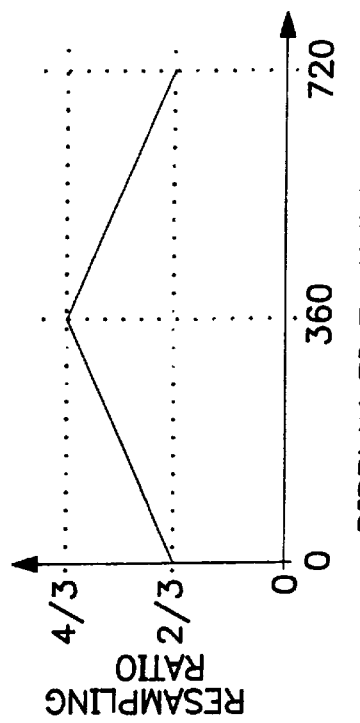
FIG. 8F shows a second ratio profile for mapping a 16:9 picture onto a 4:3 display.

FIGS. 8C and 8D show ratio profiles for mapping a 4:3 picture onto a 16:9 display. The ratios are defined in terms of input value to output value, so 4/3 is downsampling by 4 to 3 and 1/3 is up sampling 1 to 3. The ratio profiles shown in FIGS. 8C and 8D map an input picture image having 720 samples to a display having 720 samples. For example, in FIG. 8C mapping a 4:3 aspect ratio display to a 16:9 aspect ratio display uses a 4/3 downsampling., but to fill all the samples of the display requires a 1/1 average across the horizontal line. Consequently, the profile of FIG. 8C has the correct aspect ratio in the center between display pixels 24 and 480, while the values at the sides are upsampled to fill the display. FIGS. 8E and 8F illustrate the profiles used for resizing from a 16:9 display image to a 4:3 display which is the inverse of the profiles shown in FIGS. 8C and 8D.

Table 7 lists coefficient for the VPF and HZPF of one exemplary embodiment of the present invention.

TABLE 7

|  | Tap 0 | Tap 1 | Tap 2 | Tap 3 |
|---|---|---|---|---|
| Coefficients for 750P to 525P Luminance Vertical Filter | | | | |
| Phase 0 | 103 | 306 | 103 | 0 |
| Phase 1 | 10 | 246 | 246 | 10 |
| Chrominance Vertical Filter | | | | |
| Phase 0 | 25 | 462 | 25 | 0 |
| Phase 1 | −33 | 424 | 145 | −24 |
| Phase 2 | −40 | 296 | 296 | −40 |
| Phase 3 | −24 | 145 | 424 | −33 |
| Coefficients for 750P to 525I | | | | |

TABLE 7-continued

|  | | | | |
|---|---|---|---|---|
| Luminance Vertical Filter | | | | |
| Phase 0 | 145 | 222 | 145 | 0 |
| Phase 1 | 84 | 172 | 172 | 84 |
| Chrominance Vertical Filter | | | | |
| Phase 0 | 57 | 398 | 57 | 0 |
| Phase 1 | −6 | 382 | 166 | −30 |
| Phase 2 | −29 | 285 | 285 | −29 |
| Phase 3 | −30 | 166 | 382 | −6 |
| Horizontal Filter | | | | |

|  | Tap 0 | Tap 1 | Tap 2 | Tap 3 | Tap 4 | Tap 5 | Tap 6 | Tap 7 |
|---|---|---|---|---|---|---|---|---|
| Phase 0 | −8 | 13 | −17 | 536 | −17 | 13 | −8 | 0 |
| Phase 1 | −13 | 28 | −62 | 503 | 48 | −9 | 0 | 17 |
| Phase 2 | −14 | 37 | −90 | 477 | 134 | −37 | 10 | −5 |
| Phase 3 | −13 | 38 | −96 | 406 | 226 | −64 | 22 | −7 |
| Phase 4 | −10 | 31 | −85 | 320 | 320 | −85 | 31 | −10 |
| Phase 5 | −7 | 22 | −64 | 226 | 406 | −96 | 38 | −13 |
| Phase 6 | −5 | 10 | −37 | 134 | 477 | −90 | 37 | −14 |
| Phase 7 | 17 | 0 | −9 | 48 | 503 | −62 | 28 | −13 |

Figure 9A:
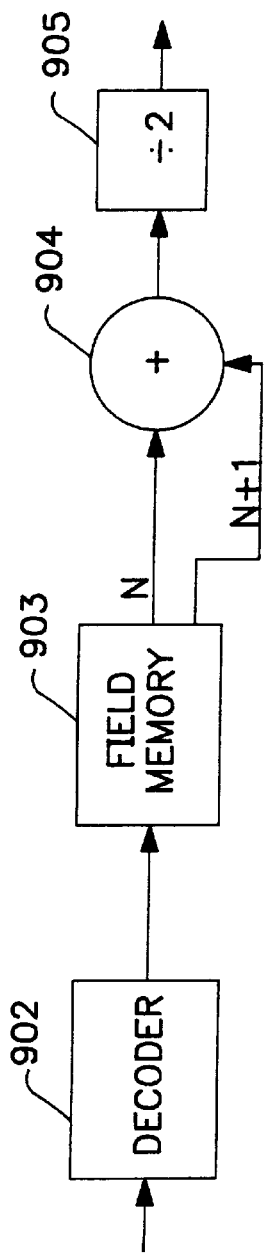
FIG. 9A illustrates a vertical interpolation process used to enhance the image quality of the exemplary embodiment of the present invention for 2:1 decimation.
Figure 9B:
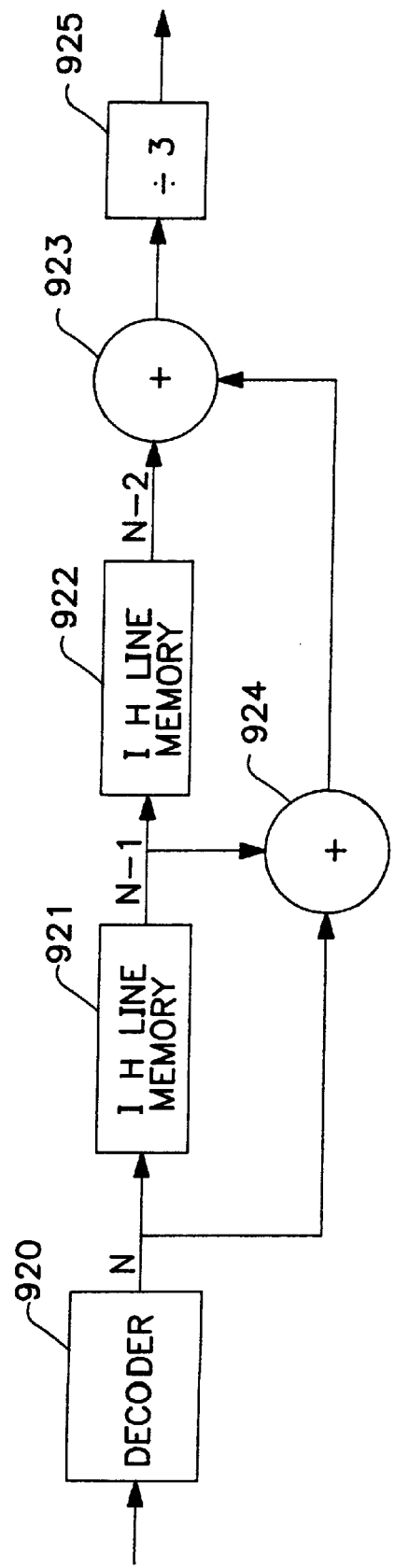
FIG. 9B illustrates a vertical interpolation process used to enhance the image quality of the exemplary embodiment of the present invention for 3:1 decimation.

For an inexpensive implementation of display conversion shown in FIG. 2B, FIG. 9A and FIG. 9B illustrate a vertical interpolation process which may be used to enhance the image quality of the exemplary embodiment of the present invention for 2:1 and 3:1 decimation. As shown in FIG. 9A, the exemplary vertical interpolation process for 2:1 decimation includes a Field memory 903, an Adder 904, and a divider 905. The down conversion Decoder 902 for 2:1 decimation provides decoded field images to the Field Memory 903 for storage. For the frame, or field, adjacent horizontal lines N and N+1 are provided from the Field Memory 903 and added in the Adder 904, and the sum is divided by 2 in Divider 905 to produce the vertically interpolated horizontal line for display on the lower resolution screen.

As shown in FIG. 9B, the vertical interpolation process for 3:1 decimation includes two Single Horizontal Line (1H) Memories 921 and 922, two Adders 923 and 924, and a Divider 925. The down conversion Decoder 920 for 3:1 decimation provides each horizontal line in sequence to 1H Memory 921. For the current horizontal line N, The adjacent horizontal line N—1 is stored in the first 1H Memory 921 and the last adjacent horizontal line is stored in the second 1H Memory 922. Adjacent horizontal lines N and N+1 are provided to the Adder 924, and the sum is added to the last adjacent horizontal line N—2 in adder 923. The 3 added adjacent lines are then divided by 3 in Divider 925 to produce the vertically interpolated horizontal line for display on the lower resolution screen. If the filter shown in FIG. 9B is used for the vertical LPF 260 of FIG. 2B, the output clock signal for the FIFO 264 would have a clock rate one-third of the higher clock rate (e.g. CLK/3 rather than CLK/2).

In alternative embodiments of the display conversion similar to that shown in FIG. 9B, vertical line interpolation in 2:1 conversion of progressive images may be accomplished by adding half the value of each even and odd vertical line pair together to create the new line. Vertical line interpolation in 2:1 conversion of interlace images may be accomplished by processing pairs of even lines in one field and pairs of odd lines in the second field. For the even lines, three quarters of the first line is added to one quarter of the second line, and for odd lines one quarter of the first line is added to three quarters of the second line.

While exemplary embodiments of the invention have been shown and described herein, it will be understood that such embodiments are provided by way of example only.

Numerous variations, changes, and substitutions will occur to those skilled in the art without departing from the spirit of the invention. Accordingly, it is intended that the appended claims cover all such variations as fall within the scope of the invention.

What is claimed:

1. An apparatus for forming a low resolution video signal from an encoded video signal representing a video image, the encoded video signal being a frequency-domain transformed high resolution video signal, the apparatus comprising:

means for receiving and for providing the encoded video signal as a plurality of high resolution frequency-domain video coefficient values;

down conversion filter means for receiving and weighting selected ones of the plurality of high resolution frequency-domain video coefficient values to form a set of filtered frequency-domain video coefficients, wherein the down conversion filter means is a lowpass filter represented by a set of frequency domain filter coefficients, and the down conversion filter means weights the selected ones of the plurality of high resolution frequency-domain video coefficient values by multiplying the set of frequency domain filter coefficients with the plurality of high resolution frequency-domain video coefficient values;

inverse-transform means for receiving and transforming the filtered frequency-domain video coefficients into a set of filtered pixel sample values; and decimating means for deleting selected ones of the set of filtered pixel sample values to provide the low resolution video signal.

2. Apparatus for forming a low resolution video signal as recited in claim 1, wherein the frequency-domain transformed high resolution video signal is transformed by a discrete cosine transform (DCT) operation, and the inverse-transform means transforms the frequency domain video coefficients by an inverse discrete cosine transform (IDCT) operation.

3. Apparatus for forming a low resolution video signal as recited in claim 1, wherein the down conversion filter means is a lowpass filter having a cutoff frequency determined by a sampling frequency of the encoded video signal divided by a decimation ratio.

4. Apparatus for forming a low resolution video signal as recited in claim 1, wherein the down conversion filter means includes a plurality of frequency domain coefficients of a lowpass block mirror filter having a predetermined number of taps.

5. The apparatus for forming a low resolution video signal as recited in claim 1, wherein the decimating means downsamples the set of filtered pixel sample values according to a decimation ratio.

6. An apparatus for forming a low resolution video signal from an encoded video signal representing a video image, the encoded video signal being a discrete cosine transformed (DCT) high resolution video signal, the apparatus comprising:

means for receiving and for providing the encoded video signal as a plurality of DCT video coefficient values;

inverse-transform means including
      means for weighting a set of the plurality of discrete cosine transform (DCT) coefficient values with a set of multi-bit down-conversion filtering coefficients by multiplying each DCT coefficient in the set of DCT coefficients with a respectively different one of the set of multi-bit down-conversion filtering coefficients to form a set of weighted DCT coefficients; and means for transforming, by an inverse DCT (IDCT) operation from a DCT domain to a spatial domain, the weighted DCT coefficients into a set of filtered pixel sample values; and decimating means for deleting selected ones of the set of filtered pixel sample values to provide the low resolution video signal.

7. A method of forming a lower resolution video signal from an encoded video signal representing a video image, the encoded video signal being a frequency-domain transformed video signal, comprising the steps of:

a) providing the encoded video signal as a plurality of discrete cosine transform (DCT) coefficient values;

b) weighting selected ones of the plurality of DCT coefficient values with a plurality of frequency domain coefficients representing a lowpass block mirror filter having a predetermined number of taps to form a set of filtered DCT coefficient values;

c) transforming the filtered DCT coefficient values according to an inverse discrete cosine transform (IDCT) operation to obtain a set of filtered pixel sample values; and d) retaining selected ones of the set of filtered pixel sample values to provide the lower resolution video signal.

8. An apparatus for forming a lower resolution video signal from an encoded video signal representing a video image, the encoded video signal being a frequency-domain transformed video signal, comprising:

means for receiving and for providing the encoded video signal as a plurality of frequency-domain video coefficient values;

combining means for combining the plurality of frequency domain video coefficient values with a set of filtering inverse-transform coefficients to produce a set of filtered pixel sample values, wherein the filtering inverse-transform coefficients are formed by multiplying a set of weighting coefficients for down-conversion and a set of inverse-transform coefficients for conversion from the frequency domain to the spatial domain;

decimating means for deleting selected ones of the set of filtered pixel sample values to produce a set of decimated pixel sample values; and means for storing the set of decimated filtered pixel sample values and for providing the stored set of decimated filtered pixel sample values as the lower resolution video signal.

9. A method of receiving an encoded video signal representing a video image, the encoded video signal being a frequency-domain transformed video signal, and forming a lower resolution video signal, the method comprising the steps of:

a) providing the encoded video signal as a plurality of frequency-domain video coefficient values;

b) combining the plurality of frequency domain video coefficient values with a set of filtering inverse-transform coefficients to produce a set of low resolution pixel sample values, wherein the filtering inverse-transform coefficients are formed by multiplying a set of weighting coefficients for low-pass filtering and a set of inverse-transform coefficients for conversion from the frequency domain to the spatial domain;

c) decimating selected ones of the set of low resolution pixel sample values; and d) storing the selected ones of the set of low resolution pixel sample values to provide the stored pixel sample values as the lower resolution video signal.

10. Apparatus for receiving an encoded video signal representing a video image, the encoded video signal being a compressed frequency-domain transformed video signal, and forming a lower resolution video signal, the apparatus comprising:

means for providing the encoded video signal as a plurality of DCT coefficient values and a motion vector;

down-conversion filter means for receiving and weighting, based on a decimation value, selected ones of the plurality of DCT coefficient values with a plurality of frequency domain coefficients representing a lowpass block mirror filter having a predetermined number of taps to form a set of filtered DCT coefficients;

inverse-transform means for receiving and transforming the filtered DCT coefficients using an inverse discrete cosine transform (IDCT) operation to obtain a set of filtered compressed pixel sample values;

translation means for receiving the motion vector and scaling the motion vector based on the decimation value;

prediction block generating means for receiving the scaled motion vector and a previous set of filtered pixel sample values, and forming a set of prediction pixel sample values;

combining means for combining the set of filtered compressed pixel sample values with the set of prediction pixel sample values to form a set of filtered pixel sample values; and decimating means for receiving and for retaining selected ones of the set of filtered pixel sample values based on the decimation value, wherein the decimating means provides the selected ones of the set of filtered pixel sample values as the lower resolution video signal.

11. Apparatus for forming a low resolution video signal as recited in claim 10, wherein the down conversion filter means is a lowpass filter having a cutoff frequency proportional to a sampling frequency of the encoded video signal divided by the decimation value.

12. Apparatus for forming a lower resolution video signal as recited in claim 10, wherein the down conversion filter means is a lowpass filter represented by a set of frequency-domain filter coefficient values, and the down conversion filter means weights the selected ones of the plurality of DCT coefficient values by multiplying the set of frequency-domain filter coefficients with respective ones of the plurality of DCT coefficient values.

13. Apparatus for forming a lower resolution video signal as recited in claim 10, wherein the prediction block generating means further includes:

memory means for storing at least one reference frame, the reference frame being a previously decoded video signal represented as the previous set of filtered pixel sample values, up-sampling means for receiving and up-sampling the reference frame, the up-sampling means and the memory means being responsive to the scaled motion vector; and half-pixel generating means for generating a plurality of half-pixel interpolated values from the up-sampled reference frame, the half-pixel generating means providing the plurality of half-pixel interpolated values as the set of prediction pixel sample values.

14. A method of receiving an encoded video signal representing a video image, the encoded video signal being a compressed frequency-domain transformed video signal, and forming a low resolution video signal, the method comprising the steps of:

a) providing the encoded video signal as a plurality of compressed high resolution DCT coefficient values and a motion vector;

b) weighting, based on a decimation value, selected ones of the plurality of compressed high resolution DCT coefficient values with a plurality of frequency domain coefficients representing a lowpass block mirror filter having a predetermined number of taps to form a set of filtered compressed DCT coefficient values;

c) transforming the filtered compressed DCT coefficient values using an inverse discrete cosine transform (IDCT) operation to obtain a set of filtered compressed pixel sample values;

d) scaling the motion vector based on the decimation value; and e) forming a set of prediction pixel sample values from the scaled motion vector and a previous set of filtered pixel sample values;

f) combining the set of filtered compressed pixel sample values with the set of prediction pixel sample values to form a set of filtered pixel sample values;

g) deleting selected ones of the set of filtered pixel sample values based on the decimation value to form the lower resolution video signal; and h) storing the pixel sample values of the low resolution video signal.

* * * * *